(12) United States Patent
DeWard et al.

(10) Patent No.: US 7,722,199 B2
(45) Date of Patent: May 25, 2010

(54) VEHICLE INTERIOR REARVIEW MIRROR ASSEMBLY WITH ACTUATOR

(75) Inventors: Joshua L. DeWard, Holland, MI (US); Keith D. Foote, Kentwood, MI (US)

(73) Assignee: Donnelly Corporation, Holland, MI (US)

( * ) Notice: Subject to any disclaimer, the term of this patent is extended or adjusted under 35 U.S.C. 154(b) by 329 days.

(21) Appl. No.: 11/842,328

(22) Filed: Aug. 21, 2007

(65) Prior Publication Data

US 2008/0049344 A1 Feb. 28, 2008

Related U.S. Application Data

(60) Provisional application No. 60/839,446, filed on Aug. 23, 2006, provisional application No. 60/952,126, filed on Jul. 26, 2007.

(51) Int. Cl.
G02B 7/182 (2006.01)
B60R 1/04 (2006.01)

(52) U.S. Cl. .................. 359/843; 359/872; 359/877; 248/481

(58) Field of Classification Search ............ 359/604, 359/843, 872, 877; 248/481
See application file for complete search history.

(56) References Cited

U.S. PATENT DOCUMENTS

| | | | |
|---|---|---|---|
| 3,059,539 A * | 10/1962 | Meade | 359/606 |
| 4,448,488 A * | 5/1984 | Nakaho | 359/606 |
| 4,524,941 A * | 6/1985 | Wood et al. | 248/544 |
| 4,895,337 A * | 1/1990 | Oskam et al. | 248/487 |
| 4,948,242 A | 8/1990 | Desmond et al. | |
| 5,624,176 A | 4/1997 | O'Farrell et al. | |
| 5,703,732 A | 12/1997 | Boddy et al. | |
| 5,796,176 A | 8/1998 | Kramer et al. | |
| 5,798,575 A | 8/1998 | O'Farrell et al. | |
| 5,818,650 A | 10/1998 | Nyhof et al. | |
| 5,823,654 A | 10/1998 | Pastrick et al. | |
| 5,838,507 A | 11/1998 | Boddy et al. | |
| 5,863,116 A | 1/1999 | Pastrick et al. | |
| 5,871,275 A | 2/1999 | O'Farrell et al. | |
| 5,879,074 A | 3/1999 | Pastrick | |
| 5,900,999 A | 5/1999 | Huizenga et al. | |
| 5,949,591 A | 9/1999 | Whitehead | |
| 5,986,364 A | 11/1999 | Bingle et al. | |

(Continued)

FOREIGN PATENT DOCUMENTS

WO    WO-2006/124682    11/2006

*Primary Examiner*—Ricky D Shafer
(74) *Attorney, Agent, or Firm*—Van Dyke, Gardner, Linn & Burkhart LLP

(57) ABSTRACT

A rearview mirror system for a vehicle includes an interior rearview mirror assembly having a mounting structure, an electrical actuator and a reflective element. The mounting structure may be configured to be detachably mounted at an attachment element adhered to an inner surface of the vehicle windshield. The mounting structure is adjustable relative to the vehicle windshield to generally vertically adjust a nominal setting of a rearward field of view of the reflective element. The electrical actuator is operable to adjust the reflective element in order to vertically and horizontally adjust a rearward field of view of the reflective element. The interior rearview mirror assembly may include an imaging sensor having a forward field of view through the vehicle windshield. The forward field of view of the imaging sensor may not be adjusted when the electrical actuator adjusts the rearward field of view of the reflective element.

2 Claims, 10 Drawing Sheets

U.S. PATENT DOCUMENTS

| | | | |
|---|---|---|---|
| 6,019,475 | A | 2/2000 | Lynam et al. |
| 6,093,976 | A | 7/2000 | Kramer et al. |
| 6,132,052 | A | 10/2000 | Huizenga et al. |
| 6,163,083 | A | 12/2000 | Kramer et al. |
| 6,175,164 | B1 | 1/2001 | O'Farrell et al. |
| 6,213,612 | B1 | 4/2001 | Schnell et al. |
| 6,229,226 | B1 | 5/2001 | Kramer et al. |
| 6,243,218 | B1 | 6/2001 | Whitehead |
| 6,340,849 | B1 | 1/2002 | Kramer et al. |
| 6,340,850 | B2 | 1/2002 | O'Farrell et al. |
| 6,362,548 | B1 | 3/2002 | Bingle et al. |
| 6,467,920 | B2 | 10/2002 | Schnell et al. |
| 6,472,773 | B2 | 10/2002 | Kramer et al. |
| 6,485,081 | B1 | 11/2002 | Bingle et al. |
| 6,595,649 | B2 | 7/2003 | Hoekstra et al. |
| 6,685,864 | B2 | 2/2004 | Bingle et al. |
| 6,690,268 | B2 | 2/2004 | Schofield et al. |
| 6,698,905 | B1 | 3/2004 | Whitehead |
| 6,755,544 | B2 | 6/2004 | Schnell et al. |
| 6,824,281 | B2 | 11/2004 | Schofield et al. |
| 6,867,510 | B2 | 3/2005 | Kramer et al. |
| 6,916,100 | B2 | 7/2005 | Pavao |
| 7,073,914 | B2 | 7/2006 | Pavao |
| 7,080,914 | B1 | 7/2006 | Boddy |
| 7,090,363 | B1 | 8/2006 | Boddy et al. |
| 7,104,663 | B2 * | 9/2006 | Whitehead ............... 359/872 |
| 7,156,358 | B2 | 1/2007 | March et al. |
| 7,184,190 | B2 | 2/2007 | McCabe et al. |
| 2004/0165293 | A1 | 8/2004 | Whitehead |
| 2005/0151396 | A1 | 7/2005 | Berberich et al. |
| 2006/0050018 | A1 | 3/2006 | Hutzel et al. |
| 2006/0061008 | A1 | 3/2006 | Karner et al. |
| 2006/0164230 | A1 | 7/2006 | DeWind et al. |
| 2007/0002477 | A1 | 1/2007 | Whitehead |
| 2007/0091626 | A1 | 4/2007 | Hook |

* cited by examiner

VEHICLE INTERIOR REARVIEW MIRROR ASSEMBLY WITH ACTUATOR

CROSS REFERENCE TO RELATED APPLICATIONS

The present application is related to U.S. provisional application Ser. No. 60/839,446, filed Aug. 23, 2006; and Ser. No. 60/952,126, filed Jul. 26, 2007, which are hereby incorporated herein by reference in their entireties.

FIELD OF THE INVENTION

The present invention generally relates to an interior rearview mirror assembly and, more particularly, to an interior rearview mirror assembly for a vehicle memory mirror system.

BACKGROUND OF THE INVENTION

Conventional vehicle memory mirror systems typically include one or more exterior mirror assemblies which are equipped with electrically operated motors that provide for repositioning of the mirror assemblies' reflective elements with respect to one or more axes. Particularly for exterior sideview mirrors, it is known to incorporate memory-positioning systems so that a driver of a vehicle may select a desired position of the exterior sideview mirror by simply pushing a button. Less known, but currently available, are memory mirror systems, which include-memory positions not only for the exterior sideview mirror assemblies but further, for the interior rearview mirror assembly. Incorporated into each of these mirror assemblies is a drive mechanism, which provides for the memory positions for each of the reflective elements in the mirror assemblies.

A conventional interior mirror assembly for a memory mirror system typically includes a housing with a pivotal portion, such as a casing, and a fixed portion, such as a mounting arm or structure, which mounts the casing to a windshield on, for example a mounting button, as is known in the art. A reflective element assembly is supported in the pivotal portion or casing by an electrical actuator. Heretofore, the actuator or drive mechanisms that have been incorporated into these interior rearview mirror assemblies necessarily add weight to the pivotal portion and, further, result in crowding out of other accessories or features which may be incorporated into the interior rearview mirror casing. While such memory mirror systems (which include both exterior and rearview mirror assemblies) are known, they are not widely used. It has been found that the weight of the motor, especially in interior mirror assemblies, has impacted the vibration performance of the mirror assembly. In addition, as the interior rearview mirror assembly has been more recently targeted as a location for storing or holding a multitude of electronic and electrical devices and accessories the space in the interior mirror assembly casing has become more coveted.

Given the increasing number of components that are desirable in an interior rearview mirror assembly, there has been an increasing need to maximize the available space in the interior rearview mirror assembly. While the weight of the electronic devices do not significantly affect the vibration characteristics of the interior rearview mirror assembly, the increasing number of electronic devices require more and more space. When coupled with the concern for the vibration performance of the interior rearview mirror assemblies of vehicle memory mirror systems, perhaps the disadvantages associated with the weight of the driving mechanism and, furthermore, the crowding out of the space within the casing has discouraged such use of designs.

Consequently, there is a need for an interior rearview mirror assembly that is suitable for a vehicle memory mirror system and yet provides ample space for a multitude of electronic devices or accessories within the casing of the interior rearview mirror assembly while exhibiting reduced vibration as compared to interior rearview mirror assemblies of conventional memory mirror systems.

SUMMARY OF THE INVENTION

The present invention provides a vehicular mirror system having an interior rearview mirror assembly with an actuator incorporated therein for electronically adjusting the rearward field of view of the mirror reflective element of the mirror assembly when the assembly is normally mounted in the interior cabin of the vehicle. The actuator is mounted to a mounting structure that is mounted to or secured at or fixedly attached proximate to a fixed, substantial structure of the vehicle, such as preferably at an interior surface of the vehicle windshield. The actuator may be positioned at and within a fixed casing or housing that may house or contain or encase other accessories or components or circuitry, and may fixedly hold such other circuitry or accessories in a fixed position relative to the vehicle. Optionally, the actuator and other structure may be mounted to an attachment structure or frame that is itself adhesively or mechanically attached to the interior windshield surface, or the interior rearview mirror assembly may be provided as a unitary stand alone assembly, including any housing, that mechanically attaches (or optionally adhesively attaches) to the windshield. The mounting structure may be fixedly or non-movably attached or coupled to the vehicle structure, and may be detachably attached thereto, such as via a mechanical attachment element or structure.

The mounting structure for the actuator is structured or configured so that the actuator and its back plate is generally oriented to support the reflective element at a nominal orientation relative to the vehicle, such as when the actuating or positioning elements or arms of the actuator are at a centered or nominal setting (and are acting normal to or perpendicular to the rear surface of the reflective element or back plate) so that the reflective element may be adjusted a similar amount in either an up or down direction or a side-to-side direction. For example, such a nominal orientation angle (of the reflective element and/or back plate of the reflective element) preferably comprises an angle of about 20-24 degrees toward the driver side of the vehicle (from a longitudinal axis of the vehicle that extends along and/or parallel to a direction of forward travel of the vehicle) and about 2-6 degrees downward (from a generally horizontal axis of the vehicle transverse to the direction of travel) when the mirror assembly is mounted at the vehicle. The actuator may be operable to adjust the reflective element about 5 to 10 degrees (or more or less) in an up, down, left and/or right direction when in the nominal or centered setting.

The mirror system includes a control that, upon the first ignition of the vehicle, such as at an automobile manufacturing or assembly plant or facility (or upon a resetting of the vehicle's settings, such as when there is electrical failure or exhaustion of the battery of the vehicle), controls the actuator to move or adjust the mirror reflective element to a home position or nominal position (such as the nominal position described above). A driver or user of the vehicle may set one or more memory positions for the reflective element to provide the particular driver with the preferred or appropriate rearward field of view. The control and actuator may selectively move or adjust the reflective element to an appropriate memory position in response to other subsequent ignitions of the vehicle or in response to a vehicle door unlock being triggered, such as via a remote keyless entry (RKE) fob or the like, or in response to other suitable triggering or activating events that are indicative of a particular driver approaching or entering or driving the vehicle. Additionally, user actuatable controls or inputs may be provided at the mirror assembly or elsewhere in the vehicle to allow the user or driver to adjust the orientation of the reflective element at any time as desired.

The actuator and mounting structure are preferably configured to angle or cant the reflective element so that the reflective element, when in a home or nominal position or orientation, is angled relative to the vehicle so as to provide a rearward field of view for a typical driver of the vehicle. Thus, the mounting structure may be configured to angle the actuator itself so that the back plate or attaching plate of the reflective element (which mounts or attaches the reflective element to the actuator) is at the nominal angle or orientation when the actuator is at a nominal or centered adjustment or setting. The mounting structure thus provides a desired mounting angle that positions the back plate and reflective element at the desired nominal angle when the actuator sets the mirror reflective element to its home or centered or initial position or orientation. The mirror housing or casing or shell is formed to accommodate the reflective element when in the nominal position and to provide an appropriate or suitable degree of movement of the reflective element (such as side-to-side and up and down pivotal movement), without interfering with the driver's field of view throughout the range of motion of the reflective element from the nominal position.

Because the mounting structure is fixedly attached at the vehicle windshield (or to another vehicle structure), the mirror assembly of the present invention provides a fixed or non-moving support for various accessories or electronic components or elements. Further, one or more user inputs may be located at the mirror casing or shell, such as at a bezel portion of the fixed mirror casing or shell, whereby actuation or physical hitting/contacting of the user inputs will not change the orientation of the reflective element and thus will not result in accidental mis-adjustment or mis-alignment of the mirror reflective element, which is mounted to the actuator fixedly attached to the mounting structure.

According to an aspect of the present invention, a rearview mirror system for a vehicle includes an interior rearview mirror assembly having a mounting structure, an electrical actuator, and a reflective element. The mounting structure is configured to be detachably mounted at an attachment element adhered to an inner surface of the vehicle windshield. The electrical actuator may be supported at the mounting structure with the weight of the electrical actuator being transferred to the vehicle windshield by the mounting of the mounting structure at the vehicle windshield. The mounting structure is adjustable relative to the vehicle windshield to generally vertically adjust a nominal setting of a rearward field of view of the reflective element. The electrical actuator is operable to adjust the reflective element in order to vertically and horizontally adjust a rearward field of view of the reflective element. The interior rearview mirror assembly may include an imaging sensor having a forward field of view through the vehicle windshield. The forward field of view of the imaging sensor may not be adjusted when the electrical actuator adjusts the rearward field of view of the reflective element.

Therefore, the present invention provides a self-contained unit or mirror assembly that provides an adjustable reflective element that is adjustable via actuation of an electronic mirror actuator. The self-contained mirror unit may include one or more electronic accessories or devices at or in the mirror casing, where the accessories/devices may be fixedly or non-movably supported irrespective of any adjustment of the reflective element, such as is advantageous for non-movable, fixed mounting of antennae, such as for global positioning systems or the like, or of forward facing image sensors or cameras or the like. The mirror unit thus provides enhanced support of such accessories/devices/user inputs and provides enhanced vibration performance of the mirror.

These and other objects, advantages, purposes and features of the present invention will become apparent upon review of the following specification in conjunction with the drawings.

DESCRIPTION OF THE PREFERRED EMBODIMENTS

Figure 1:
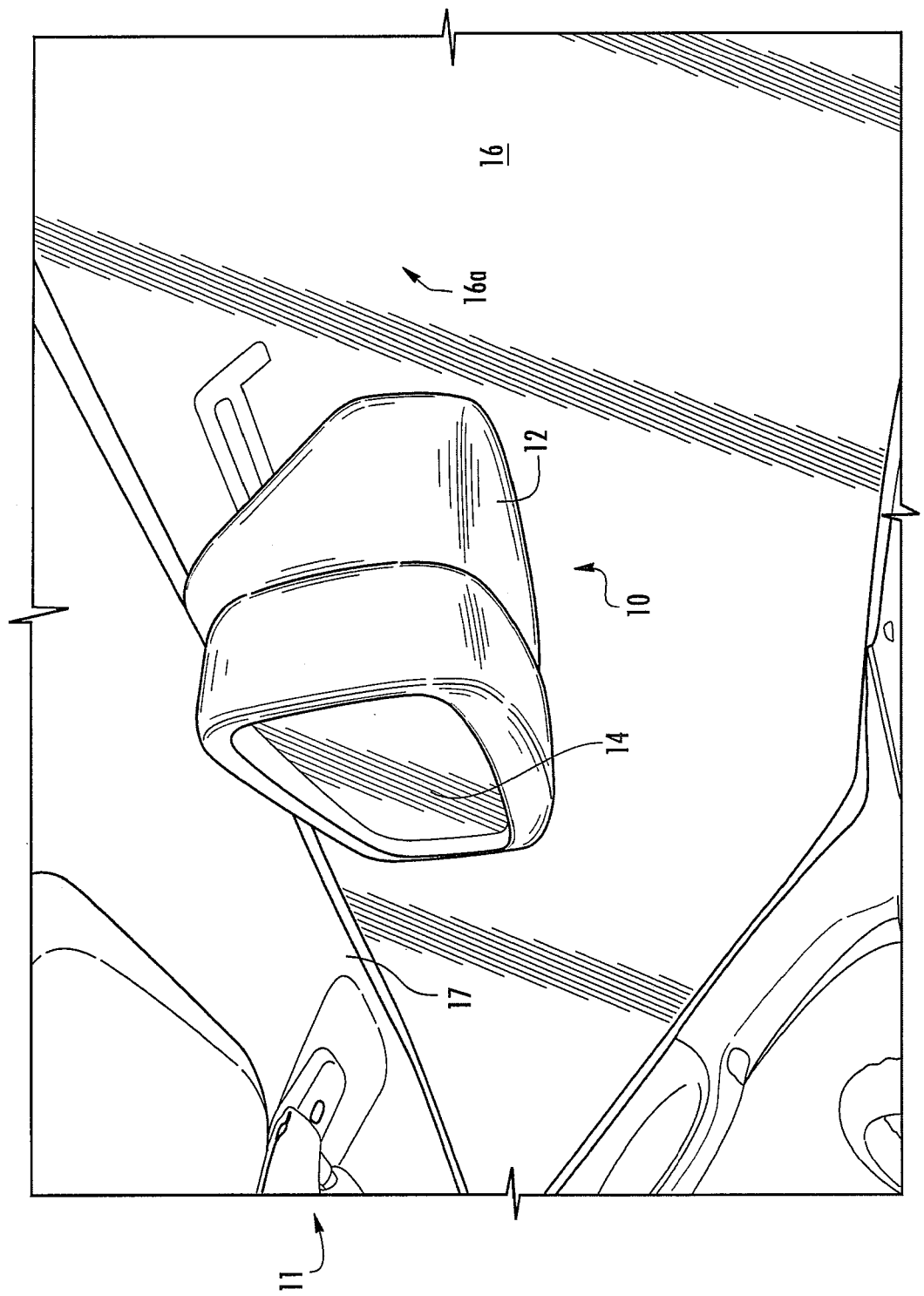
FIG. 1 is a perspective view of an interior rearview mirror assembly incorporating a mirror actuator in accordance with the present invention.
Figure 2:
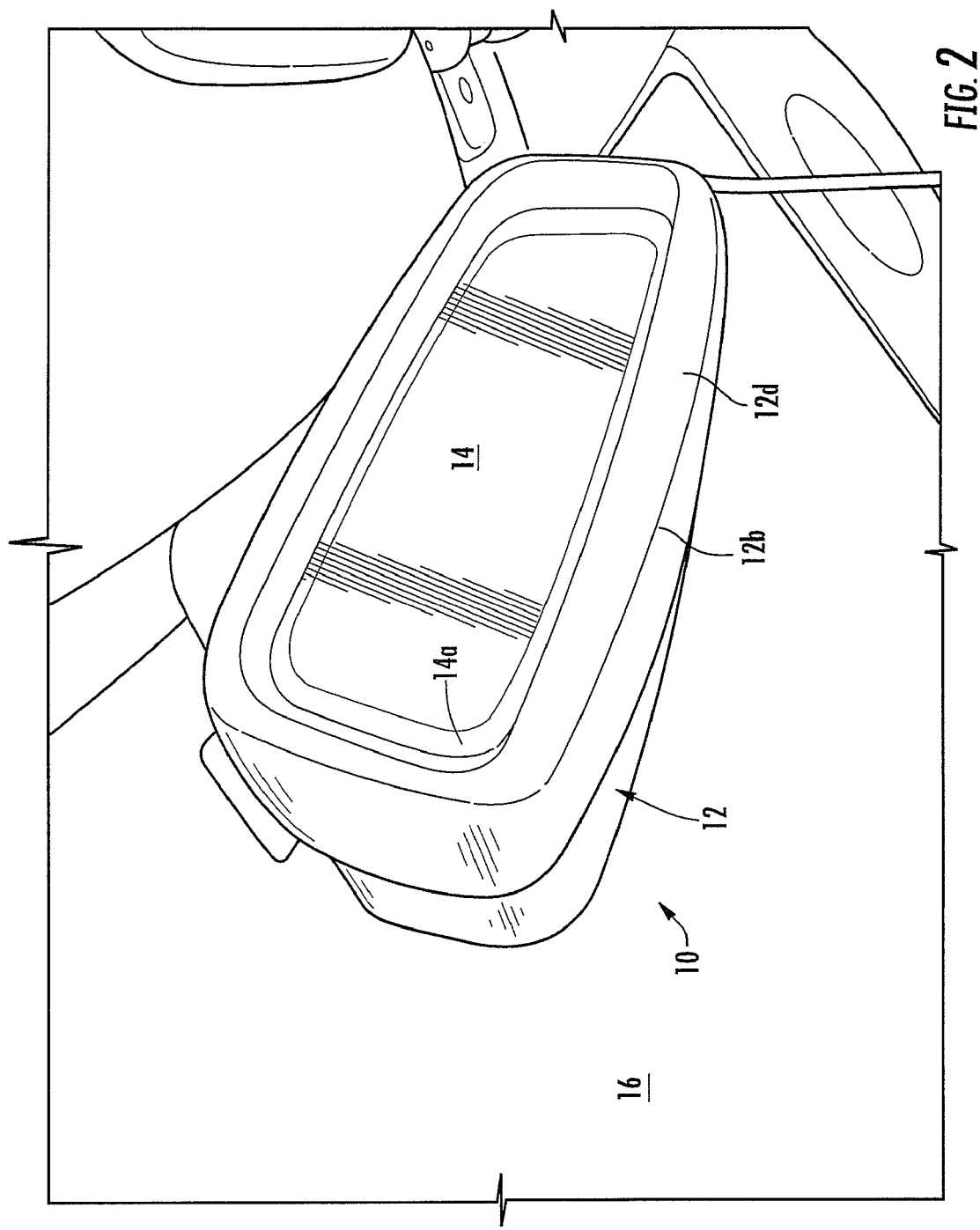
FIG. 2 is another perspective view of the interior rearview mirror assembly of the present invention.

Referring now to the drawings and the illustrative embodiments depicted therein, an interior rearview mirror assembly 10 for a vehicle 11 includes a mirror casing or housing 12 and a reflective element 14 adjustably positioned at and partially in mirror casing 12 (FIGS. 1 and 2). Mirror assembly 10 includes a mirror mounting structure 15 for fixedly or non-movably mounting or attaching mirror assembly 10 at a fixed structure of the vehicle, such as at an interior surface 16a of a vehicle windshield 16. Reflective element 14 is adjustably positioned at or partially in mirror casing 12 and is adjustable via an actuator 18 (FIG. 5), which is attached at the rear of the reflective element 14 and at mounting structure 15, so that actuation of actuator 18 causes adjustment of mirror reflective element 14 relative to mounting structure 15 and to mirror casing 12 (which may also be fixedly or non-movably mounted at the mounting structure and/or windshield) so as to adjust a rearward field of view of the driver of the vehicle, as discussed below. The mirror assembly and/or mirror actuator may utilize aspects of the mirror systems described in U.S. Pat. No. 6,698,905, and U.S. patent application Ser. No. 10/790,309, filed Mar. 1, 2004 by Whitehead for MEMORY MIRROR SYSTEM FOR VEHICLE, now U.S. Pat. No. 7,104,663; and Ser. No. 11/504,353, filed Aug. 15, 2006 by Whitehead for VEHICULAR MIRROR SYSTEM, which are hereby incorporated herein by reference in their entireties. Although shown and described as being mounted to the vehicle windshield, it is envisioned that, optionally, the mirror assembly may be located or attached elsewhere at the vehicle, such as at an overhead console or headliner 17 of the vehicle or the like.

Figure 5:
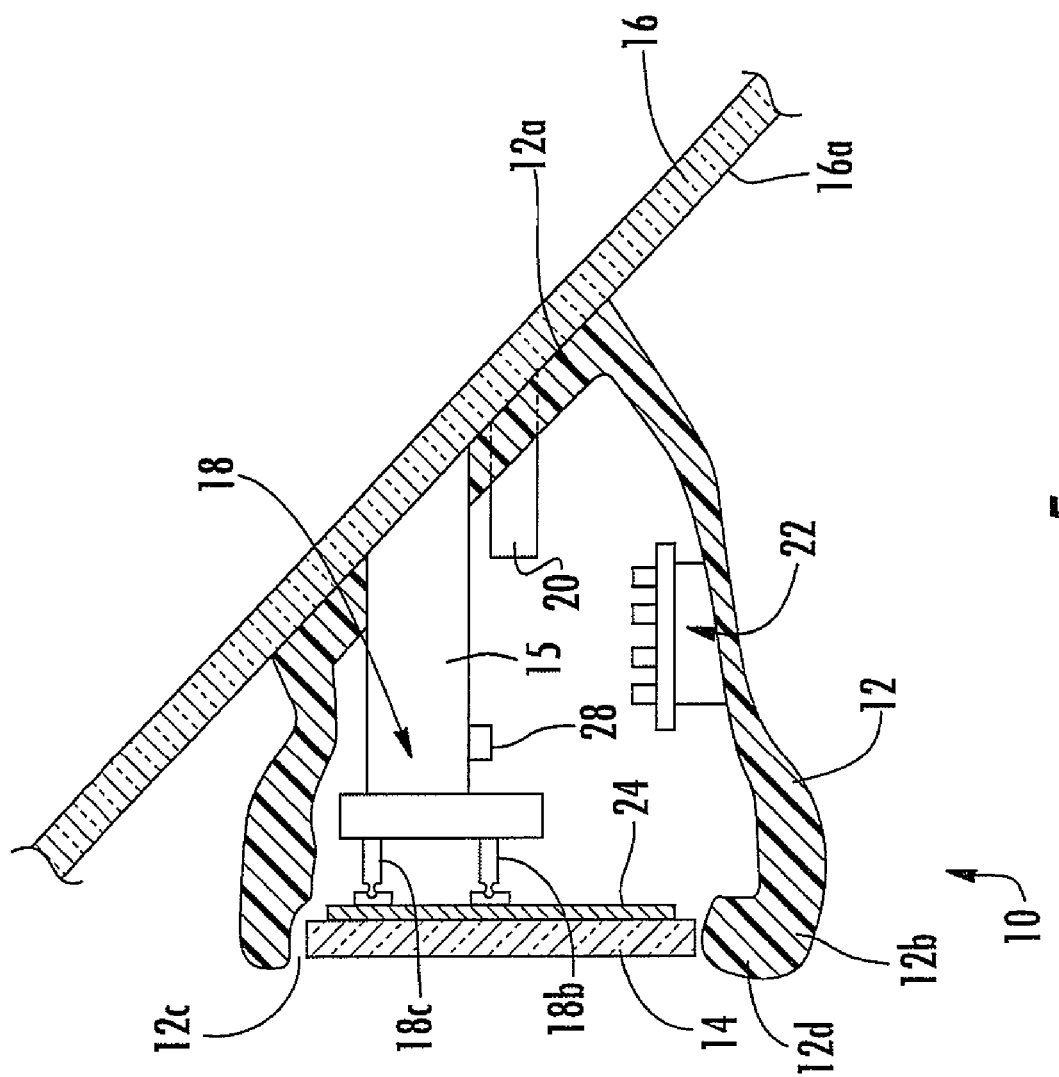
FIG. 5 is a sectional view of an interior rearview mirror assembly of the present invention.

As shown in FIGS. 1, 2 and 5, mirror casing 12 preferably comprises a unitary casing that includes a forward facing portion or mounting portion 12a that abuts the interior surface of the windshield 16 and that may attach thereto. Mirror casing 12 includes a reflective element receiving portion 12b that at least partially receives the reflective element 14 therein (such as at an opening 12c of reflective element receiving portion 12b), so that the reflective element 14 is partially received in and surrounded by or framed by or enveloped by or encompassed by a bezel portion 12d of reflective element receiving portion 12b of mirror casing 12. Mirror casing 12 is preferably unitarily formed or molded and comprises a suitable plastic or polymeric material, such as ABS material or the like. Mirror casing 12 may be non-movably positioned relative to the vehicle, such as via non-movably attaching the mirror casing at the vehicle or at the mirror mounting structure.

Figure 3:
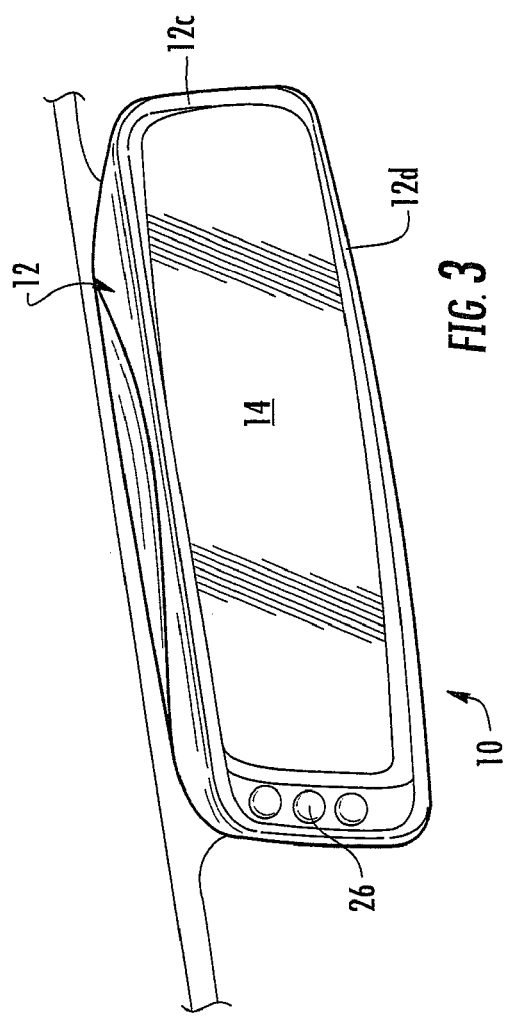
FIG. 3 is a perspective view of an interior rearview mirror assembly in accordance with the present invention.
Figure 4:
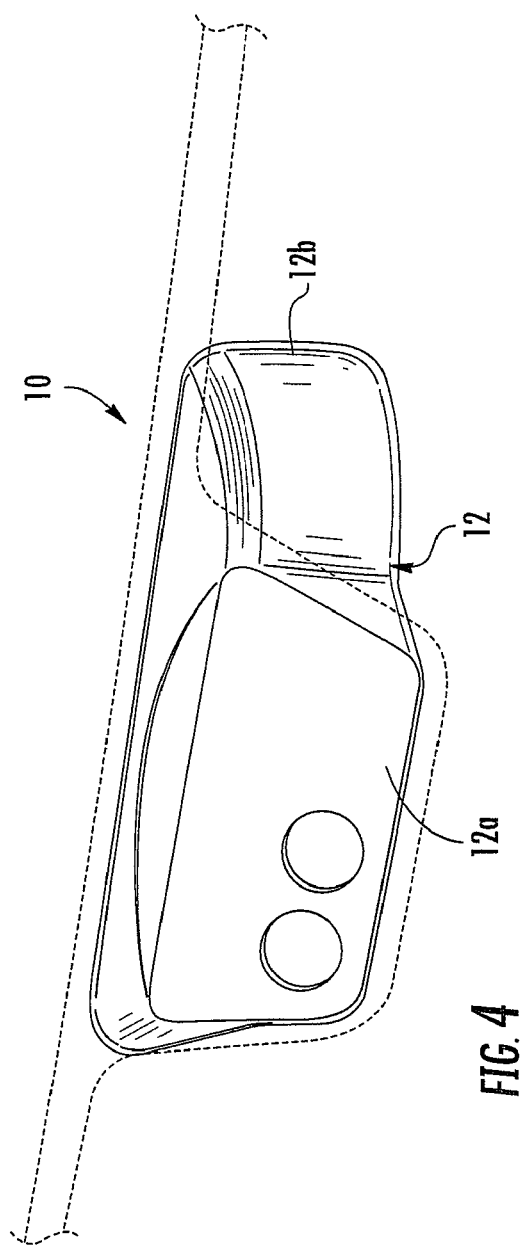
FIG. 4 is a perspective view of the interior rearview mirror assembly of FIG. 3, as viewed through a windshield of a vehicle when mounted at the vehicle.

The mirror casing 12 receives the actuator 18 therein, and may mount or support other components and/or circuitry therein, as discussed below. When positioned or mounted in or at the vehicle (such as at the interior surface of the vehicle windshield or the like), the actuator 18 is mounted at and supported by the mirror mounting structure 15 so as to support the reflective element at a nominal orientation when the actuator is centered or at its nominal or centered setting. Thus, the reflective element 14 (which is adjustably supported by actuator 18) may be initially or selectively located or oriented at a nominal position or orientation that is angled for proper rearward viewing by a typical vehicle driver. For example, the actuator may be mounted (via the mounting structure) to support the reflective element at a nominal orientation that is canted or angled at about 20 degrees to about 24 degrees toward the driver side of the vehicle (relative to a longitudinal axis of the vehicle that extends along the vehicle and in a forward/rearward direction along the vehicle), and preferably about 22 degrees toward the driver side of the vehicle, and about 2 degrees to about 6 degrees downward (relative to a generally horizontal axis of the vehicle that is generally transverse to the direction of travel of the vehicle), and preferably about 4 degrees downward, when the mirror casing is mounted at the vehicle. The actuator may adjust the reflective element relative to the mounting structure and relative to the mirror casing and the vehicle and about horizontal and vertical pivot axes to adjust the field of view for the particular driver of the vehicle, such as described below. Thus, the mirror casing is preferably angled or configured to accommodate the reflective element at the nominal setting (and is configured so that the bezel portion or face of the bezel of the mirror casing or shell is in a plane that is substantially parallel to the plane of the rearward surface of the reflective element when the reflective element is in the nominal or home position). As can be seen with reference to FIG. 3, the mirror casing or shell may be angled so that a rearward (toward the rear of the vehicle when the mirror assembly is mounted at the vehicle windshield) facing surface or face of the bezel portion is angled or canted, such as at an angle that is about 20 to 24 degrees toward the driver side of the vehicle (relative to the longitudinal axis of the vehicle) and about 2 to 6 degrees downward (relative to a generally horizontal plane) so as to accommodate the reflective element at its nominal position.

Optionally, the mounting structure 15 and/or mirror casing 12 may mount or attach to windshield 16 via a conventional channel mount or mounting button (not shown), such as described in U.S. Pat. Nos. 5,820,097; 5,487,522; 5,671,996; 5,820,097; 5,615,857; 5,330,149; 5,100,095; 4,930,742, which are hereby incorporated herein by reference in their entireties, which may provide a break-away mounting or release mechanism as is known in the art. Optionally, mounting structure 15 and/or mirror casing 12 may mount to the windshield and/or headliner and/or overhead console or the like via other suitable mounting means, such as by utilizing aspects of the mounting elements described in U.S. Pat. Nos. 6,824,281; 5,487,522; 5,615,857; or 5,671,996, and/or U.S. patent application Ser. No. 10/958,087, filed Oct. 4, 2004 by Schofield et al. for VEHICLE ACCESSORY MODULE, now U.S. Pat. No. 7,188,963; and/or Ser. No. 11/226,628, filed Sep. 14, 2005; and/or Ser. No. 11/584,697, filed Oct. 20, 2006, now U.S. Pat. No. 7,510,287, which are hereby incorporated herein by reference in their entireties, which are hereby incorporated herein by reference in their entireties. Optionally, the mounting structure and/or mirror casing may be adjustably or movably mounted at the vehicle windshield, and may be generally vertically movable along the windshield, such as via a motorized slide that moves the mechanism up and down along the interior surface of the windshield for further adjustment of the driver's rearward field of view. Such further freedom of adjustment of the mounting structure and/or mirror casing may be manual or motorized depending on the particular application of the mirror assembly and system.

Reflective element 14 may be attached to mirror actuator 18, such as via an attaching plate or backing plate 24 at a rear surface of the reflective element. Reflective element 14 may comprise an electro-optic reflective element, such as an electrochromic reflective element or the like (such as the types discussed below), or may comprise a prismatic reflective element or the like (such as the types also discussed below), while remaining within the spirit and scope of the present invention.

Optionally, and preferably, reflective element 14 may comprise a frameless reflective element, such as by utilizing aspects of the reflective elements described in PCT Application No. PCT/US2006/018567, filed May 15, 2006 by Donnelly Corp. et al.; PCT Application No. PCT/US2004/015424, filed May 18, 2004 by Donnelly Corp. et al. for MIRROR ASSEMBLY FOR VEHICLE, and published on Dec. 2, 2004, as International Publication No. WO 2004/103772; and/or U.S. patent application Ser. No. 11/140,396, filed May 27, 2005, now U.S. Pat. No. 7,360,932; Ser. No. 11/226,628, filed Sep. 14, 2005; Ser. No. 11/021,065, filed Dec. 23, 2004, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; and/or Ser. No. 10/538,724, filed Jun. 13, 2005, which are hereby incorporated herein by reference in their entireties. Optionally, and desirably, the reflective element 14 may include a metallic perimeter band 14a (FIG. 2) around the perimeter of the reflective element, such as by utilizing aspects of the reflective elements described in PCT Application No. PCT/US2006/018567, filed May 15, 2006 by Donnelly Corp. et al.; PCT Application No. PCT/US03/29776, filed Sep. 19, 2003 by Donnelly Corp. et al. for ELECTROCHROMIC MIRROR ASSEMBLY; and/or PCT Application No. PCT/US03/35381, filed Nov. 5, 2003 by Donnelly Corp. et al. for ELECTRO-OPTIC REFLECTIVE ELEMENT ASSEMBLY; and/or U.S. patent application Ser. No. 11/021,065, filed Dec. 23, 2004 by McCabe et al. for ELECTRO-OPTIC MIRROR CELL, now U.S. Pat. No. 7,255,451; and/or Ser. No. 11/226,628, filed Sep. 14, 2005 by Karner et al. for MOUNTING ASSEMBLY FOR VEHICLE INTERIOR MIRROR, which is hereby incorporated herein by reference in their entireties. The frameless reflective element 14 thus is aesthetically pleasing to a person viewing the mirror assembly, since the reflective element (as recessed or partially recessed in the opening 12c of bezel portion 12d of mirror casing 12) does not include a separate frame or bezel portion around its perimeter edge. The metallic perimeter band 14a may be selected to have a desired color or tint to match or contrast a color scheme or the like of the vehicle, such as described in PCT Application No. PCT/US2006/018567, filed May 15, 2006 by Donnelly Corp. et al.; and/or PCT Application No. PCT/US2004/015424, filed May 18, 2004 by Donnelly Corp. et al. for MIRROR ASSEMBLY FOR VEHICLE, and published on Dec. 2, 2004, as International Publication No. WO 2004/103772, which are hereby incorporated herein by reference in their entireties.

Reflective element 14 is attached to mirror actuator 18 and is adjustable relative to mirror casing 12 and mounting structure 15 via actuation of actuator 18. Reflective element 14 is adjustable about one or more axes via actuation of actuator 18. For example, reflective element 14 may be adjustable about a generally horizontal or cross-car axis (so as to pivot generally upward and downward) and about a generally vertical axis (so as to pivot generally side-to-side), so that the driver of the vehicle may adjust the reflective element to provide the desired rearward field of view, such as through a rear window of the vehicle.

Preferably, actuator 18 is mounted directly to mounting structure 15, which is at or attached to the vehicle windshield (or elsewhere at the vehicle), or alternately actuator 18 may be mounted to an inner surface or wall of the mirror casing (which may be secured to the vehicle or to the mounting structure). Thus, actuator 18 is rigidly supported at the mounting structure 15 and at or within mirror casing 12 with the weight of actuator 18 being directly transferred to windshield 11 by way of the mounting structure of the mirror casing and mirror assembly. Actuator 18 is thus disposed at and substantially proximate to the windshield and is coupled to the windshield with rigid interconnecting structure with no pivot elements or joints so as to provide a reduced or minimal lever arm affect, such that the windshield may function as a vibrational dampener or vibration sink, whereby movement or vibration (such as vibration associated with actuation of the actuator) is directly transferred to the windshield with minimal lever arm effect at the actuator and reflective element. Thus, the vibration is carried by the windshield and not by the mirror reflective element. When coupled to the windshield via the substantially rigid mounting structure, the actuator supports the reflective element at its nominal or home position when the actuator is at its centered or home setting, which provides a nominal or home orientation of about 22 degrees toward the driver side of the vehicle and about 2 to 6 degrees downward, such as described above.

The mounting structure 15 and mirror casing 12 thus are fixedly attached to the vehicle windshield (or optionally to another vehicle structure, such as an overhead console or the vehicle headliner), whereby other accessories or electronic elements or circuitry may be included or incorporated in the mirror casing so as to be fixedly secured within the mirror casing and relative to the vehicle. Because the mounting structure and mirror casing are fixedly mounted to the fixed windshield of the vehicle, it can be appreciated that mirror assembly 10 and mirror casing 12 exhibit reduced vibration and may provide ample space for storing a wide variety of accessories and devices. For example, the mirror casing may be used to store or house a variety of electrical and electronic devices, such as, for example, a forward facing imaging sensor or camera 20 (FIG. 5), such as for a camera-based rain sensor system or a camera-based automatic headlamp control system or camera-based lane departure warning system or the like, and/or compass sensors 22, and/or other circuitry or elements or components as may be desired depending on the particular application of the mirror assembly, such as described below.

Actuator 18 may comprise any suitable electrical actuator that is operable to adjust the reflective element about one or more axes. As shown in FIG. 5, actuator 18 includes an actuator housing 18a (which may be fixedly secured to mirror casing 12), and attachment elements or positioning elements 18b, 18c, which extend from housing 18a and pivotally attach to the rear of the reflective element 14 (such as to the rear of a backing plate 24 or the like at the rear surface of the reflective element), and which may be longitudinally adjustable to extend/retract to adjust the position of or pivot reflective element 14. Housing 18a may include one or more motors and associated gearing (not shown) for driving and/or extending and/or retracting the positioning element or elements 18b, 18c relative to housing 18a, such as is known in the art of exterior mirror actuators. Actuator thus may actuate to move the actuating or positioning elements 18b, 18c, which act generally perpendicularly to the rear of the reflective element and perpendicular to the glass itself, such as is described in U.S. Pat. No. 5,900,999, which is hereby incorporated herein by reference in its entirety. Actuator 18 may utilize aspects of exterior mirror actuators of the types described in U.S. Pat. Nos. 7,080,914; 7,073,914; 6,916,100; 6,755,544; 6,685,864; 6,467,920; 6,362,548; 6,243,218; 6,229,226; 6,213,612; 5,986,364 and 5,900,999, which are hereby incorporated herein by reference herein in their entireties, or may comprise any other suitable actuator designs. Optionally, it is envisioned that the electrical actuator may incorporate one or more muscle wires (such as muscle wires of the types described in U.S. Pat. No. 6,485,081, which is hereby incorporated herein by reference in its entirety) which are operable to pull or push in response to an electrical signal. Muscle wires, which are also known as shape memory alloy, can assume radically different forms or "phases" at distinct temperatures. When conducting an electric current, the muscle wire heats and shortens in length, generating a useable amount of force. Such muscle wires are typically bi-metals such as of a nickel-titanium alloy (such as Nitinol) and are attached such that the wires contract when electricity is applied.

Actuator 18 thus is selectively operable to adjust the mirror reflective element 14 relative to mirror casing 12 in a similar manner as actuators for conventional exterior rearview mirror assemblies. The actuator may be selected to provide lateral or side-to-side adjustment of the reflective element and/or vertical or up and down adjustment of the reflective element. Preferably, the actuator is operable to provide at least about 5 degrees of adjustment from a nominal position of the reflective element in each of the four axial directions (left, right, up and down) so as to provide substantial adjustment of the reflective element along both axes (horizontal and vertical), and more preferably, the actuator is operable to provide at least about 10 degrees of adjustment of the reflective element in each direction from a nominal position of the reflective element relative to the casing (in other words, the actuator may adjust the reflective element vertically and horizontally through a range of about 20 degrees along each axis). Thus, the reflective element may be adjusted to adapt the rearward field of view for the particular driver of the vehicle. Because the casing is formed to support the reflective element at a nominal or pre-angled orientation such that the reflective element is canted about 22 degrees toward the driver side of the vehicle (relative to a longitudinal axis of the vehicle that extends along a direction of forward travel of the vehicle) and about 2-6 degrees downward (relative to a generally horizontal axis that is generally transverse to the direction of travel of the vehicle) when the casing is secured at the vehicle windshield (or elsewhere in or at the vehicle), such a 20 degree adjustment range (plus or minus 10 degrees from the nominal position) is sufficient to adapt the rearward field of view for most if not all potential drivers of the vehicle.

Optionally, and desirably, the memory mirror system may include a control 28 (FIG. 5) that controls the mirror actuator (and thus controls the orientation of the mirror reflective element) in response to a vehicle input. For example, the control may, upon the first ignition of the vehicle (such as when the vehicle ignition is first started or cycled at the vehicle manufacturing or assembly facility or plant) or upon a resetting of the vehicle's settings (such as when there is electrical failure or exhaustion of the battery of the vehicle), control the actuator to move or adjust the mirror reflective element to a home position or nominal position. Such a nominal orientation angle may comprise the nominal position described above, having an angle of about 22 degrees toward the driver side of the vehicle (from a longitudinal axis of the vehicle that extends along a direction of forward travel of the vehicle) and about 2 to 6 degrees downward (from a generally horizontal axis that is generally transverse to the direction of travel of the vehicle) when the mirror assembly is mounted at the vehicle.

After the vehicle is purchased or used by a driver, the driver or user of the vehicle may set one or more memory positions for the reflective element to provide the particular driver with the preferred or appropriate rearward field of view. Such memory positions may be stored at the control or may be accessible by the control so that the control may actuate the actuator to set the reflective element at the appropriate orientation when a driver elects a particular memory position. Optionally, and desirably, the control and actuator may selectively move or adjust the reflective element (and/or reflective elements of the interior and exterior mirror assemblies) to an appropriate memory position in response to other subsequent ignitions of the vehicle or in response to a vehicle door unlock being triggered, such as via a signal from a remote keyless entry (RKE) fob or the like, or in response to other suitable triggering or activating events that are indicative of a particular driver approaching or entering or driving the vehicle.

Thus, the actuator is initially at its centered or home setting (whereby it may be adjusted about 5 to 10 degrees in either sideward direction and/or up and down directions) so that the mirror reflective element is initially set at the nominal position or orientation (such as about 22 degrees toward the driver side and about 2 to 6 degrees downward) when the ignition is first cycled (either following assembly of the vehicle and/or exhaustion of the vehicle battery or resetting of the vehicle systems or the like). Preferably, the mirror casing is configured to accommodate the reflective element at that home or nominal orientation (and is configured or angled so that the bezel portion or face of the bezel of the mirror casing or shell is generally along a plane that is substantially parallel to the plane of the rearward surface of the reflective element when the reflective element is in the nominal position). Thus, and as can be seen with reference to FIG. 3, the mirror casing or shell is angled so that a rearward face of the bezel portion is angled, such as at an angle that is about 22 degrees toward the driver side of the vehicle (relative to the longitudinal axis of the vehicle) and about 2 to 6 degrees downward (relative to a generally horizontal plane) so as to accommodate the reflective element at its nominal position.

Actuator 18 may be selectively operable in response to actuation of a user input or toggle switch or keypad or joystick or the like, whereby a user may press an arrowed button or directional keypad to adjust the reflective element toward the desired or appropriate or associated direction or angle. The user input may be located at a driver side door (or at the instrument panel and toward the driver side of the vehicle or at or on the steering wheel of the vehicle so as to be readily accessible and actuatable by the driver of the vehicle), and may be associated with control of the exterior rearview mirrors as well. For example, the user input may have a selector switch or buttons or the like that a user may actuate to select which mirror is being controlled (such as a three-way selector or multiple buttons or inputs for the user to select the appropriate mirror) and then the user may actuate the directional controls to adjust that reflective element. For example, a user may select a left switch position to set the input to control the driver side exterior mirror, a center switch position to set the input to control the interior rearview mirror, and a right switch position to set the input to control the passenger side exterior mirror. The user input may communicate the control signals to the interior rearview mirror assembly (and/or exterior rearview mirror assemblies depending on the selection switch) via a wire connection or via a wireless communication link, such as via various protocols or nodes, such as Bluetooth, SCP, UBP, J1850, CAN J2284, Fire Wire 1394, MOST, LIN and/or the like, depending on the particular application of the interior rearview mirror assembly and/or system of the present invention.

Optionally, the user input for directional control of the actuator 18 (and/or actuators of the exterior mirrors as well) may be located at the interior rearview mirror assembly, such as at the bezel portion 12b of mirror casing 12. The user may then readily access the user input (such as a touch pad or joystick or the like) and actuate or touch the input or inputs to adjust the reflective element to provide the desired or appropriate rearward field of view. The user input may include a selector switch or input to allow the user to select which mirror is to be adjusted, whereby actuation of the user input may adjust the reflective element at the interior rearview mirror assembly or the reflective element at one of the exterior mirror assemblies. Because the bezel portion of the mirror casing 12 is fixedly secured relative to the vehicle, placement of the user inputs (or other user inputs or buttons or the like) at the fixed bezel portion 12d of mirror casing 12 will not result in mis-adjustment of the reflective element during actuation of or touching or pressing or contacting such user inputs. The user thus may press against or touch the user input or inputs at the bezel portion without such pressing causing undesirable movement of the bezel portion and the reflective element.

Optionally, and desirably, actuator 18 of interior rearview mirror assembly 10 may be operable in conjunction with the actuators of the exterior rearview mirrors of the vehicle and as part of a memory mirror system. For example, actuator 18 may be coupled to an electronic control system, which includes mirror-based control modules positioned at or in each exterior rearview mirror assembly and the interior rearview mirror assembly, and a vehicle-based control module that is interconnected to each of the respective mirror-based control modules. The control module may be located in the vehicle, such as, for example, in a vehicle door or in or behind the dashboard or the like. The control module or control may be operable to set the interior rearview mirror and one or more exterior rearview mirrors to a particular orientation (for example, a first or second memory position or orientation) in response to an input, such as a signal from a key fob or detection/recognition of a particular user of the vehicle or the like.

Optionally, and in addition to the above, the control module may be associated with other vehicle control functions such as seat position control, window controls, or the like. For further details of a suitable memory mirror electronic control system, reference is made to U.S. Pat. Nos. 6,698,905; 6,163,083; 5,798,575; and 5,796,176, which are hereby incorporated herein by reference in their entireties. Examples of suitable exterior rearview mirrors can be found in U.S. Pat. Nos. 6,163,083 and 5,798,575, the disclosures of which are herein incorporated by reference in their entireties. Reference is also made to U.S. Pat. Nos. 5,949,591; 5,879,074; 5,863,116; 5,871,275; 5,823,654; 5,669,699; 5,669,704; 5,624,176; 5,497,305; 5,786,772; 5,929,786; and 5,971,552, which are hereby incorporated herein by reference in their entireties, for other features that may be incorporated into the exterior rearview assemblies. Optionally, the reflective elements of the exterior rearview mirror assemblies may be controlled and/or may move in conjunction with movement of the reflective element 14 of interior rearview mirror assembly 10, such as in a master-slave fashion, such as by utilizing aspects of the mirror systems described in U.S. Pat. Nos. 6,867,510; 6,465,904; 6,904,348; 6,595,649; and 6,515,378, which are hereby incorporated herein by reference in their entireties. Optionally, the control circuitry and memory locations for the exterior mirrors and the interior mirror may be located/stored in the mirror casing of the mirror assembly 10, such as at or on a circuit board or the like located within the mirror casing.

Because the mirror casing 12 is fixedly attached or mounted at the vehicle, the mirror casing has reduced vibration as compared to conventional adjustable mirror casings. The actuator and the mounting bracket or element of the mirror casing (such as a mounting button or channel mount or the like) thus are linked to the vehicle windshield, such that vibration that may occur to or within the mirror casing is dampened by the windshield itself. Optionally, the reflective element may be mounted to the mirror actuator via stabilizer fingers or the like (such as are known in the art of exterior rearview mirror assemblies and such as are described in U.S. Pat. No. 5,818,650, which is hereby incorporated herein by reference in its entirety) to enhance the vibration performance of the reflective element. The stabilizer fingers function as springs at the outer perimeter of the reflective element to absorb vibration.

The mirror casing thus may be suitable for supporting larger or heavier components or circuitry that otherwise may not have been suitable for mounting or locating at or in a mirror casing. For example, the mirror casing may house or support a batter or power pack for various electronic features or components, and/or may support a docking station for docking and/or holding a cellular telephone or hand-held personal data device or the like, such as by utilizing aspects of the systems described in U.S. Pat. No. 6,824,281, and/or PCT Application No. PCT/US03/40611, filed Dec. 19, 2003 by Donnelly Corporation for ACCESSORY SYSTEM FOR VEHICLE, and/or U.S. patent application Ser. No. 10/510,813, filed Aug. 23, 2002 by Berberich et al. for COVER MODULE, now U.S. Patent Application Publication No. US2005/0151396A1, published Jul. 14, 2005, which are hereby incorporated herein by reference in their entireties.

Referring now to FIGS. 6-11, an interior rearview mirror assembly 110 for a vehicle includes a mirror casing or housing 112 and a reflective element 114 adjustably positioned at a mirror mounting structure 115, which fixedly or non-movably mounts or attaches mirror assembly 110 at a fixed structure of the vehicle, such as at an interior surface of a vehicle windshield or the like. Reflective element 114 is adjustable via an actuator 118, which is attached at the rear of the reflective element 114 and at mounting structure 115, so that actuation of actuator 118 causes adjustment of mirror reflective element 114 relative to mounting structure 115 so as to adjust a rearward field of view of the driver of the vehicle, such as in a similar manner as described above. Although described as being mounted to the vehicle windshield, it is envisioned that, optionally, the mirror assembly may be located or attached elsewhere at the vehicle, such as at an overhead console or headliner of the vehicle or the like. Mirror assembly 110 and actuator 118 may utilize aspects of the mirror assembly 10 and actuator 18, discussed above, such that a detailed discussion of the various aspects of the mirror assemblies and actuators need not be repeated herein.

Figure 6:
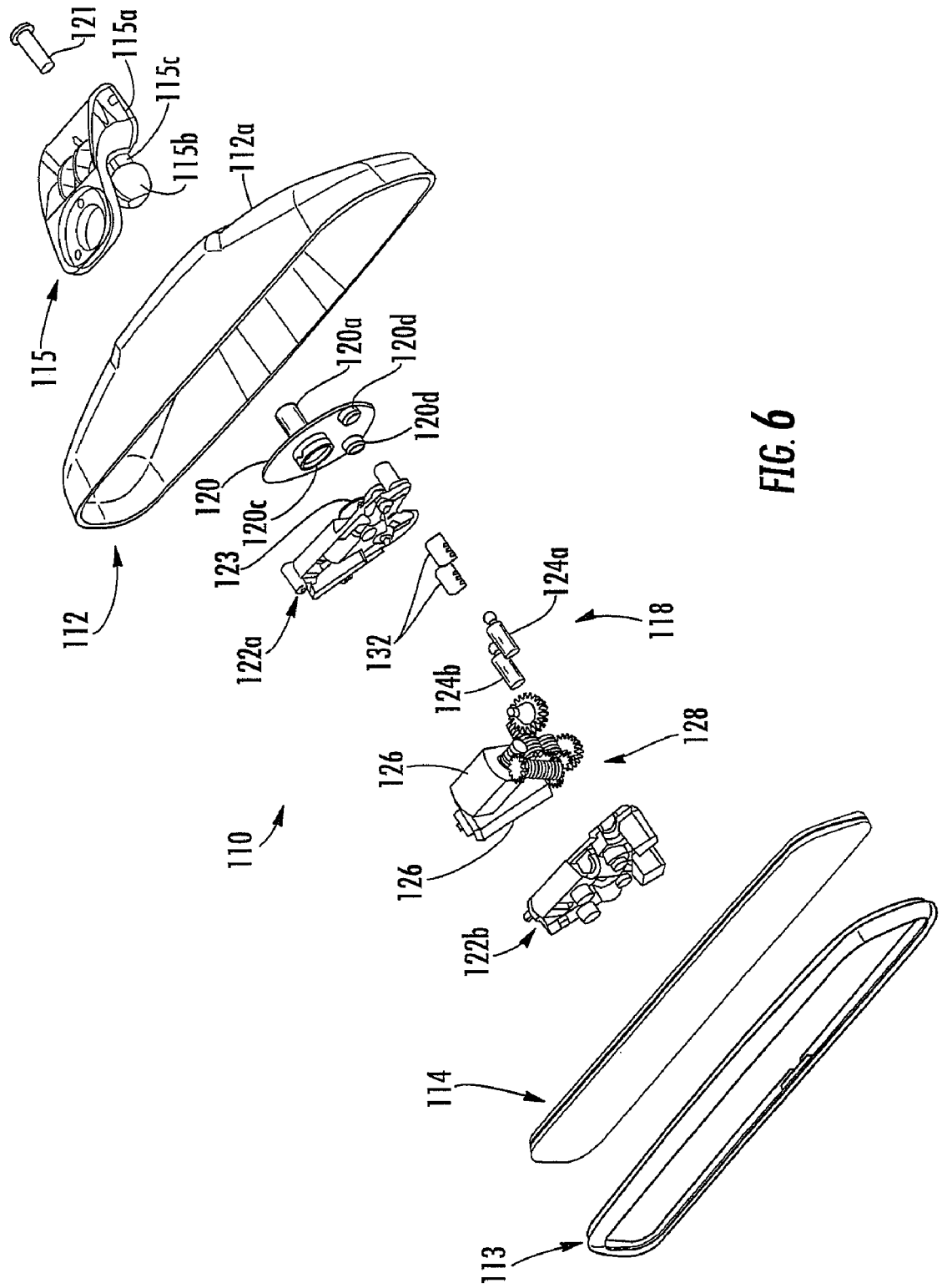
FIG. 6 is an exploded perspective view of another interior rearview mirror assembly of the present invention.
Figure 7:
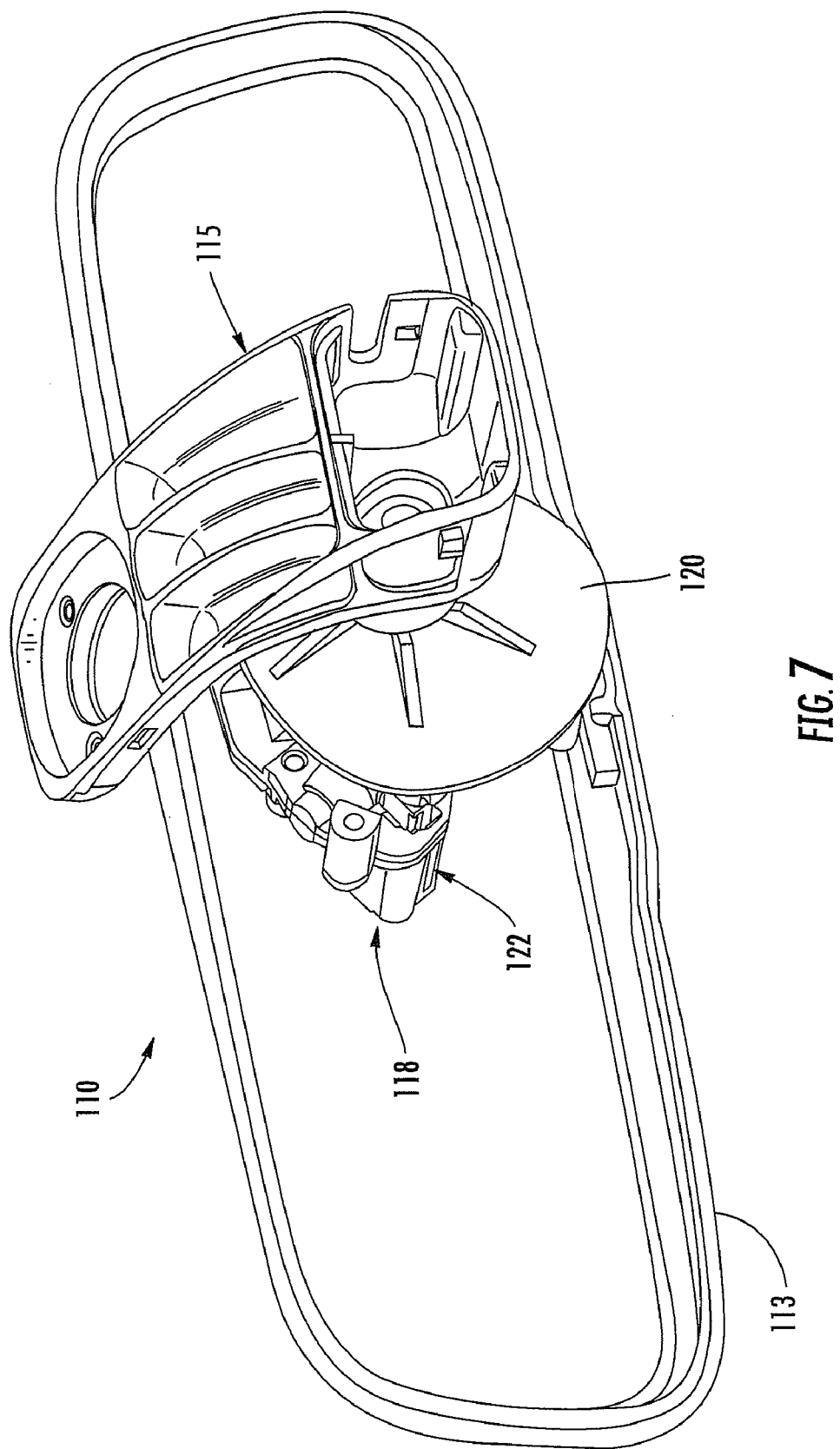
FIG. 7 is a rear perspective view of the interior rearview mirror assembly of FIG. 6, with the mirror casing removed to show additional details.
Figure 8:
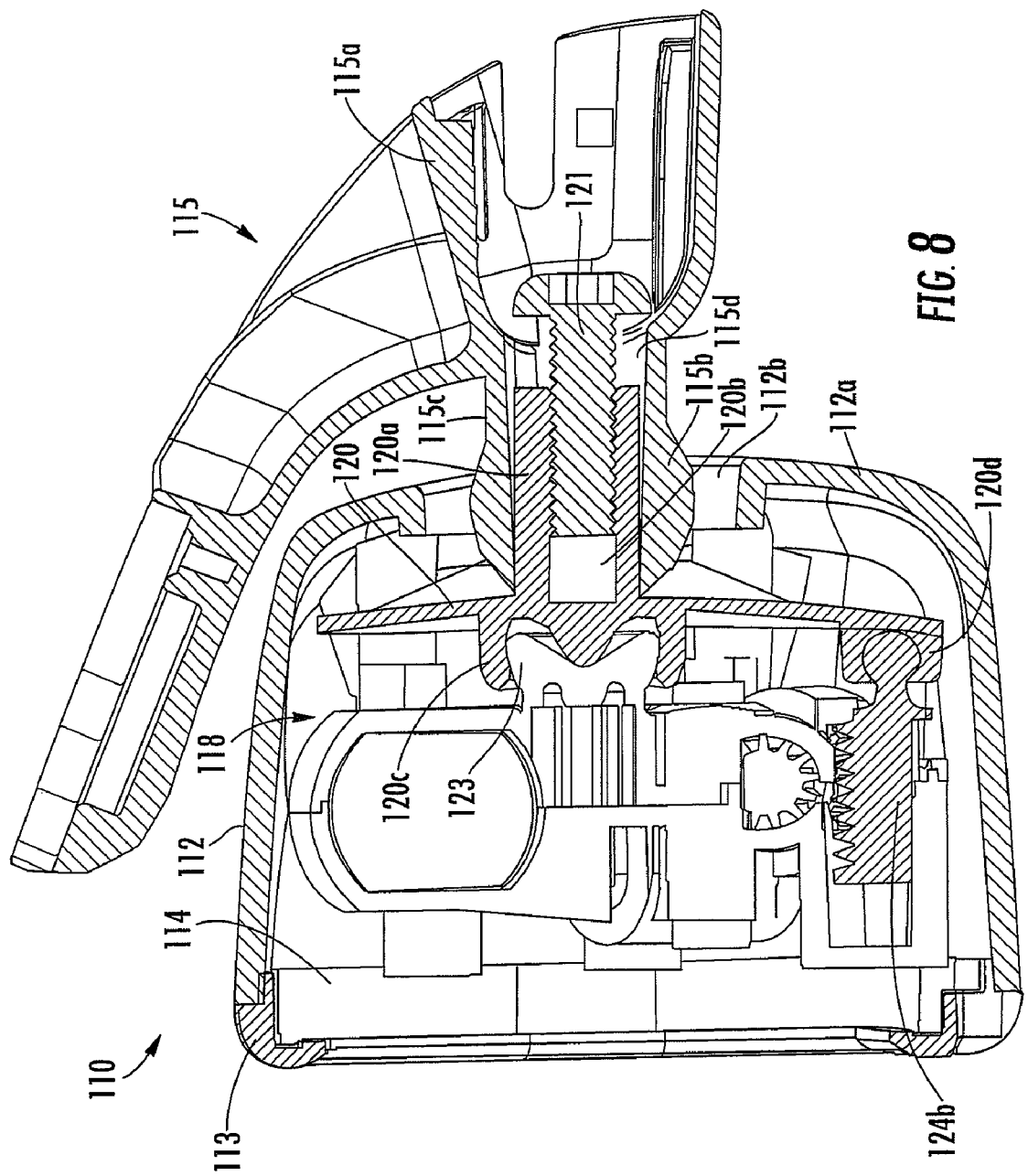
FIG. 8 is a sectional view of the interior rearview mirror assembly of FIGS. 6 and 7.
Figure 9:
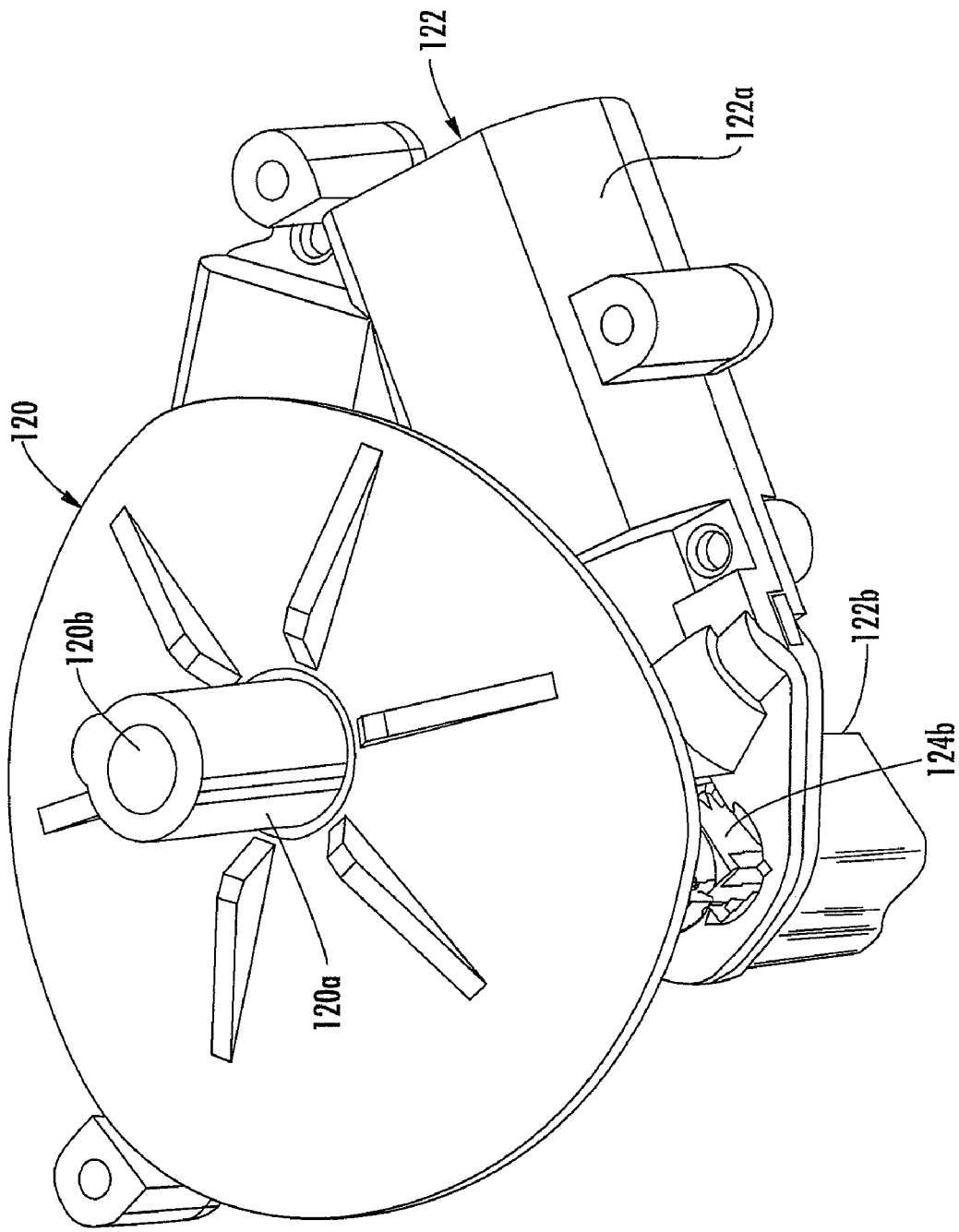
FIG. 9 is a perspective view of an actuator and mounting plate of the interior rearview mirror assembly of FIGS. 6-8.

As shown in FIGS. 6-8, reflective element 114 is received in or mounted at or to or in casing 112 and a bezel portion 113. Bezel portion 113 attaches to casing 112 (such as in a known manner) to secure or retain reflective element 114 therein, so that the reflective element 114 is partially received in and surrounded by or framed by or enveloped by or encompassed by bezel portion 113 and mirror casing 112. Casing 112 has an aperture or opening 112b at its rear portion or wall 112a for receiving a portion of mounting structure 115 therein or therethrough when the mirror assembly is mounted to the mounting structure, as discussed below.

Mounting structure 115 includes a base portion 115a that is configured for mounting to a structure, such as to an interior surface of a vehicle windshield or to an accessory module or overhead console of the vehicle or the like. Mounting structure includes a mounting ball 115b extending from base portion 115a and rearwardly or in a direction generally rearwardly relative to the direction of travel of the vehicle when the mirror assembly is mounted in a vehicle. In the illustrated embodiment, ball member 115b is a partial spherical ball member formed or established at a rearward end of a support arm 115c. As best seen in FIG. 8, ball member 115b and support arm 115c have a passageway 115d formed or established therethrough and are configured to receive a mounting arm or post 120a of a mounting plate 120 therein, as discussed below.

Mounting plate 120 is fixedly secured to mounting structure 115 via insertion of mounting post 120a into passageway 115d of ball member 115b and support arm 115c, whereby a retaining element 121 (such as a threaded fastener or bolt or pin or the like) may be inserted into passageway 115d (such as from the opposite end of the passageway from the ball member) and threaded into a threaded passageway 120b of mounting post 120a, such as shown in FIG. 8. Optionally, other fastening means or elements may be utilized to secure mounting plate 120 to mounting structure 115, while remaining within the spirit and scope of the present invention. Optionally, the passageway through the support arm and ball member may provide a channel or conduit or passageway for a wire or wire harness or cable or the like to be routed through to provide electrical connection and/or power and/or control to an accessory of the mirror assembly and a wire harness of the vehicle, such as a wire harness at or in the headliner of the vehicle or the like (such as by utilizing aspects of the mounting structures described in U.S. patent application Ser. No. 11/226,628, filed Sep. 14, 2005; and/or Ser. No. 11/584,697, filed Oct. 20, 2006, now U.S. Pat. No. 7,510,287, which are hereby incorporated herein by reference in their entireties).

Mounting plate 120 engages actuator 118 to adjustably mount reflective element 114 and actuator 118 to mounting plate 120. In the illustrated embodiment, mounting plate 120 includes a generally centrally located cup or receiving or pivotally attaching element or portion 120c for adjustably engaging a cup or guide or securing element 123 of an actuator housing 122 (such as a housing formed of two housing portions 122a, 122b connected together or engaged together) of actuator 118 (as discussed below), and a pair of receiving elements 120d for receiving or engaging adjusting posts or elements 124a, 124b of actuator 118 (as also discussed below). Thus, the mounting plate 120 is fixedly attached to the mounting structure 115 and adjustably engages actuator 118, whereby mounting plate 120 is adjusted about at least two pivot axes relative to housing 122 of actuator, while being retained at or to housing 122 of actuator via the positioning elements 124a, 124b and the securing element 123 of actuator 118.

Actuator 118 may comprise any suitable electrical actuator that is operable to adjust the reflective element about one or more axes, such as an actuator utilizing aspects of the actuators discussed above. In the illustrated embodiment, actuator 118 includes actuator housing 122 (which may be fixedly secured to reflective element 114 and mirror casing 112), and attachment elements or positioning elements 124a, 124b, which extend from housing 122 and pivotally engage or attach to the rear of the mounting plate 120 (such as at the receiving elements 120d at the rear of mounting plate 120), and which may be longitudinally adjustable to extend/retract to adjust the position or orientation of actuator 118 and reflective element 114 relative to mounting structure 115. In the illustrated embodiment, the reflective element and housing may move together relative to the support structure in response to actuation of the actuator. Optionally, the housing may be fixedly mounted to or attached to the mounting plate and/or support structure (such as at a preset or preselected orientation), whereby the reflective element may be adjusted relative to the housing and the support structure in response to actuation of the actuator.

Figure 10:
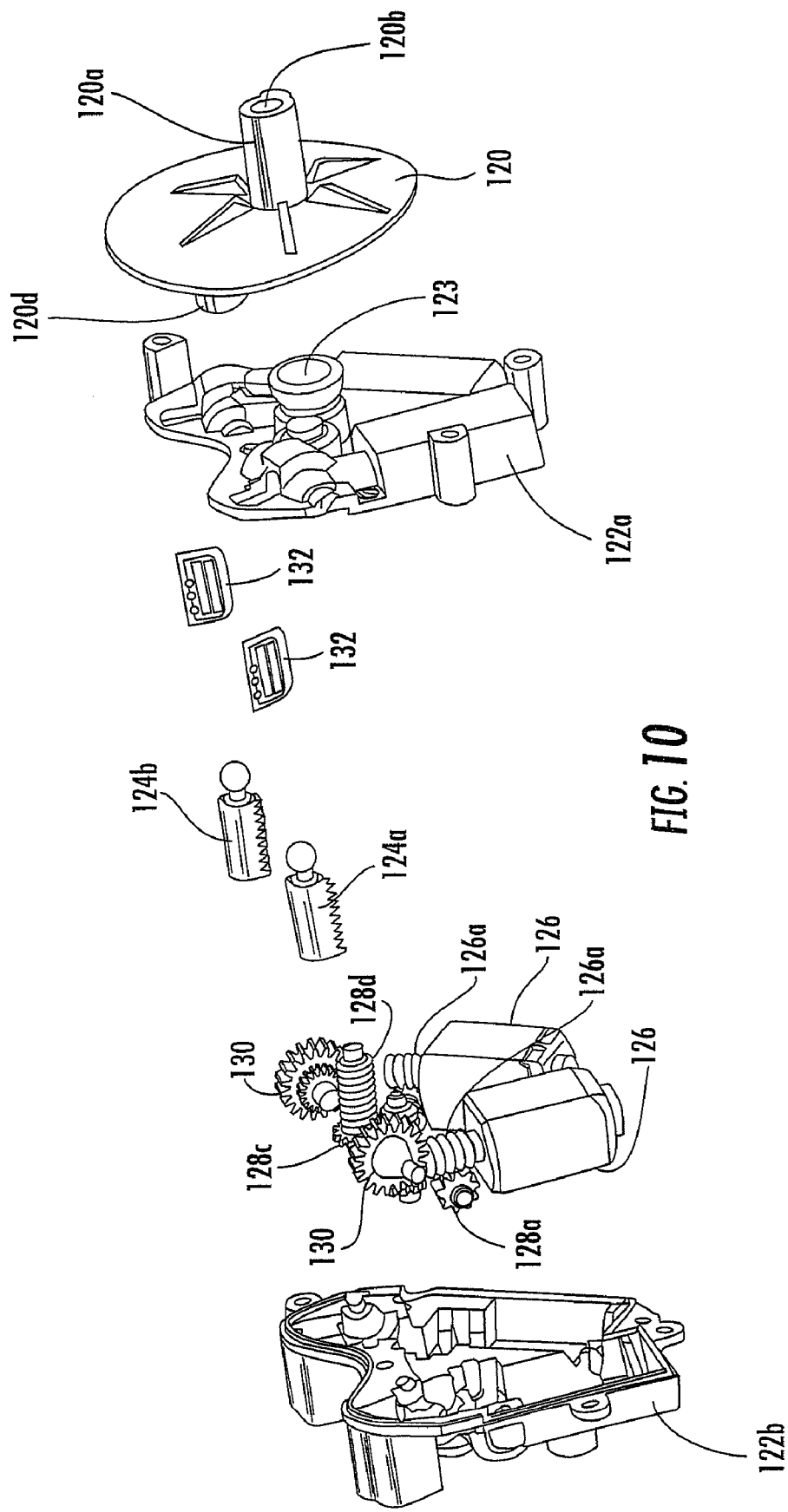
FIG. 10 is an exploded perspective view of the actuator and mounting plate of FIG. 9.
Figure 11:
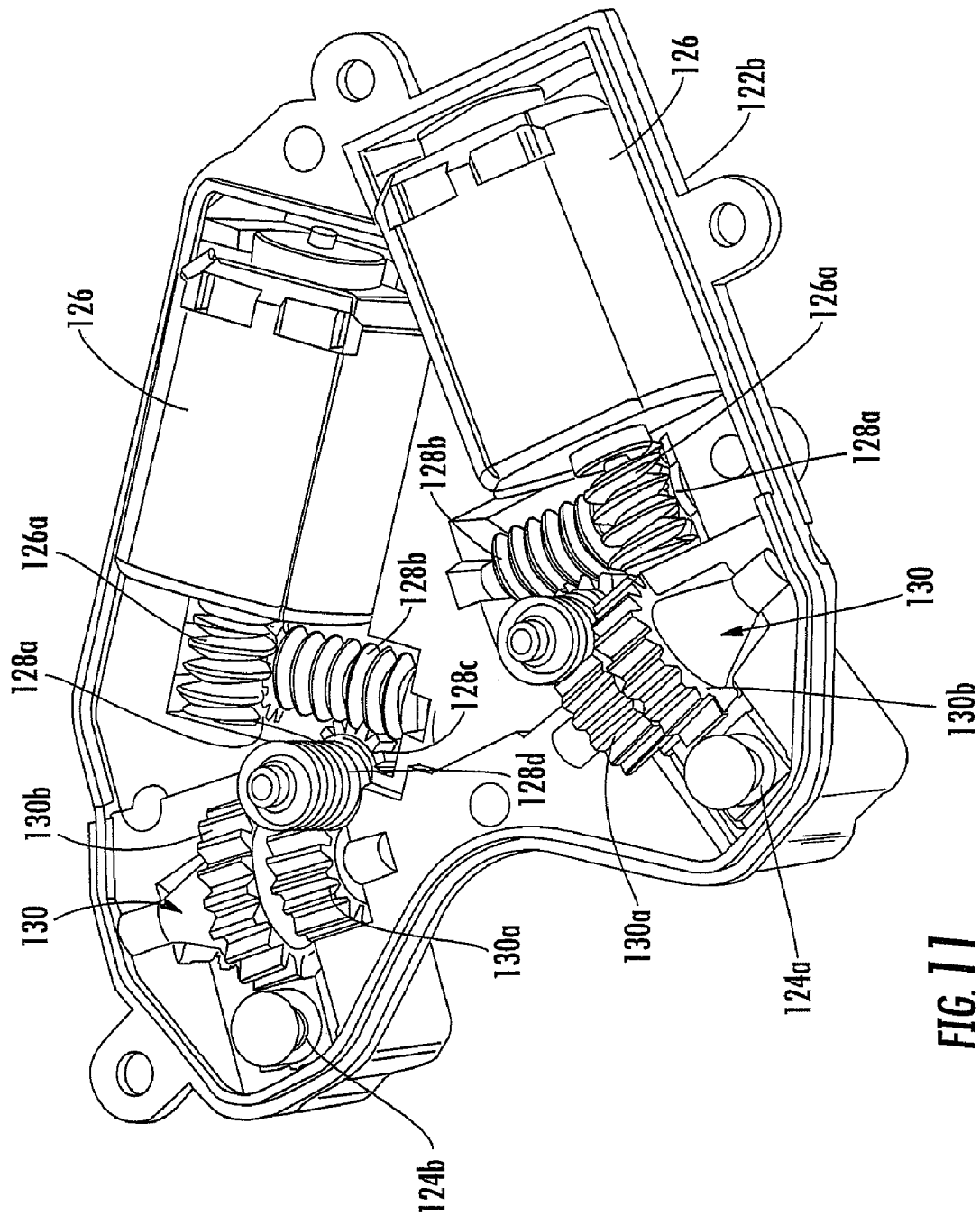
FIG. 11 is a perspective view of the actuator of the interior rearview mirror assembly of FIGS. 6-8.

Housing 122 may house or contain a pair of motors 126 and associated gearing 128 for driving and/or extending and/or retracting the positioning element or elements 124a, 124b relative to housing 122, such as in a manner similar to that known in the art of exterior mirror actuators. Motors 126 and gearing 128 are received within the housing 122 and operate to move the positioning elements 124a, 124b. In the illustrated embodiment (and as best shown in FIGS. 10 and 11), each electrical motor 126 is operable to rotatably drive a worm gear 126a, which in turn rotatably drives a spur gear 128a of gearing 128. Rotation of spur gear 128a imparts a corresponding rotation of another worm gear 128b that rotatably drives another spur gear 128c and worm gear 128d. Rotation of spur gear 128c and worm gear 128d further rotatably drives a first spur gear 130a of a clutch device or mechanism 130, which has a second spur gear 130b that engages teeth along the respective positioning elements 124a, 124b to impart a translational movement of the positioning elements in either direction. Other types of gear mechanisms or drive mechanisms may be utilized while remaining within the spirit and scope of the present invention.

The clutch device 130 of actuator 118 allows for relative rotation between the first and second spur gears 130a, 130b to allow for manual movement of the mirror casing and reflective element without affecting or rotating the gears and motors of the actuator. The clutch device also functions to limit or reduce or substantially precludes undesirable clunking sounds when the mirror actuator moves the positioning element or elements to the end of their range of motion in either direction. Actuator 118 thus may actuate to move the actuating or positioning elements 124a, 124b which act generally perpendicularly to the rear of the reflective element and perpendicular to the glass itself, such as is described in U.S. Pat. No. 5,900,999, which is hereby incorporated herein by reference in its entirety, while allowing for selective manual adjustment of the reflective element. Preferably, the actuator is operable in a quiet manner, and preferably provides a sound quality level of less than about 5 sones (at the driver position) or thereabouts.

Optionally, the mirror assembly may have a memory function to allow for positioning of the reflective element to a stored orientation (such as in response to unlocking of the doors via a particular key fob or selection and actuation of a user input by the driver of the vehicle or the like). For example, actuator 118 may include a memory element or device 132 at or near or associated with each positioning element 124a, 124b so that the control of the actuator can determine the present location of the mirror reflective element (via the degree of extension or retraction of the positioning elements) and can actuate the mirror actuator to adjust the reflective element orientation to a preselected or stored orientation. In the illustrated embodiment, the memory elements 132 comprise potentiometers or the like that determines the degree of extension or retraction of or the position of the positioning elements, but other position determining devices or elements may be utilized without affecting the scope of the present invention. Such memory elements 132 at or near or associated with the positioning elements 124a, 124b allow the mirror assembly to determine the location of the mirror reflective element and adjust the reflective element to a stored position even if the reflective element has been manually adjusted (such that the positioning elements are not at the location that the actuator previously set them to). Optionally, and as also discussed above, the mirror assembly and/or mirror actuator may utilize aspects of the mirror systems described in U.S. Pat. No. 6,698,905, and U.S. patent application Ser. No. 10/790,309, filed Mar. 1, 2004 by Whitehead for MEMORY MIRROR SYSTEM FOR VEHICLE, now U.S. Pat. No. 7,104,663; and Ser. No. 11/504,353, filed Aug. 15, 2006 by Whitehead for VEHICULAR MIRROR SYSTEM, which are hereby incorporated herein by reference in their entireties.

Optionally, the mounting structure 115 may mount or attach to the vehicle windshield via a conventional channel mount or mounting button (not shown), such as described in U.S. Pat. Nos. 5,820,097; 5,487,522; 5,671,996; 5,820,097; 5,615,857; 5,330,149; 5,100,095; 4,930,742, which are hereby incorporated herein by reference in their entireties, which may provide a break-away mounting or release mechanism as is known in the art. Optionally, mounting structure 115 may mount to the windshield and/or headliner and/or overhead console or the like via other suitable mounting means, such as by utilizing aspects of the mounting elements described in U.S. Pat. Nos. 7,188,963; 6,824,281; 5,487,522; 5,615,857; and/or 5,671,996, and/or U.S. patent application Ser. No. 11/226,628, filed Sep. 14, 2005, which are hereby incorporated herein by reference in their entireties. Optionally, the mounting structure may be adjustably or movably mounted at the vehicle windshield, such as described above.

Reflective element 114 may be attached to mirror actuator 118, such as via an attaching plate or backing plate at a rear surface of the reflective element. Reflective element 114 may comprise an electro-optic reflective element, such as an electrochromic reflective element or the like (such as the types discussed herein), or may comprise a prismatic reflective element or the like (such as the types also discussed herein), while remaining within the spirit and scope of the present invention. Reflective element may comprise an electro-optic reflective element and/or frameless reflective element or a prismatic reflective element, such as described above.

Reflective element 114 is thus attached to mirror actuator 118 and is adjustable relative to mounting structure 115 via actuation of actuator 118. Reflective element 114 is adjustable about one or more axes via actuation of actuator 118. For example, reflective element 114 may be adjustable about a generally horizontal or cross-car axis (so as to pivot generally upward and downward) and about a generally vertical axis (so as to pivot generally side-to-side), so that the driver of the vehicle may adjust the reflective element to provide the desired rearward field of view, such as through a rear window of the vehicle.

Although shown as mounting to a ball member 115b of mounting structure 115, the mounting plate 120 may fixedly mount to other mounting structures, without affecting the scope of the present invention. For example, the mounting plate may be inserted into or otherwise attached to a mounting arm or post extending from the mounting base of the mounting structure, or may even be unitarily formed with or partially formed with the mounting structure.

Although shown and described as having a single ball mounting structure, it is envisioned that the mirror assembly may mount to a double ball mounting structure having a base portion and a mounting arm that is adjustably mounted to the base portion at a ball joint, and with the mounting plate of the mirror assembly attaching to the other end of the mounting arm, such as in a similar manner as described above. In such an application, the ball joint may allow for "rough adjustment" of the mirror assembly to generally approximate the desired location or nominal or home setting, while the actuator may more finely adjust the mirror reflective element (such as when or after the reflective element is at a selected one of two or more nominal settings) to the desired orientation for providing the driver with the desired rearward field of view or the like. Optionally, the ball joint may have a detent or a plurality of detents (such as two or more detents) or positioning or locating elements that retain the ball joint at the respective orientation and limit pivotal movement of the mounting arm to the base portion when at a selected position or orientation or detent. For example, the ball joint (or other type of joint allowing for pivotal movement of the arm relative to the base portion about at least one pivot axis) may have three detent positions, such as an upper, intermediate and lower position or orientation such that a driver may first position the mirror reflective element at a level that he or she is comfortable with, and may then adjust the reflective element (via actuation of the actuator) to obtain the desired rearward field of view. Preferably, the joint closer to the mounting base may have a higher torque rating so that a greater force is required to pivot the mounting arm relative to the base portion about the joint then is required to manually pivot the reflective element relative to the mounting arm.

Optionally, and desirably, the reflective element and mirror actuator are removable and/or serviceable so that if there is a problem with a particular reflective element or mirror actuator or other component or module, the problematic component or module may be removed and repaired/replaced without having to remove/replace the entire mirror assembly. The reflective element thus may be removably mounted to the actuator and the actuator may be removably attached to the mounting structure and/or mirror casing so that the reflective element and/or actuator may be removed from the mounting structure and/or mirror casing for service and/or replacement of the reflective element and/or mirror actuator or other component or module.

Also, because of the fixed mounting configuration of the mounting structure and/or mirror casing, the mounting structure and/or mirror casing is/are suitable for supporting other devices or components or circuitry in a fixed or non-adjustable or non-moving manner, such as components or circuitry that otherwise may be mounted or located at a fixed accessory module or pod at or near the interior rearview mirror assembly. For example, the mounting structure and/or mirror casing may support compass sensors, such as compass sensors of the types described in may utilize aspects of the compass systems described in U.S. patent application Ser. No. 11/305,637, filed Dec. 16, 2005 by Blank et al. for INTERIOR REARVIEW MIRROR SYSTEM WITH COMPASS, now U.S. Pat. No. 7,329,013; Ser. No. 10/352,691, filed Jan. 28, 2003 by Schierbeek et al. for VEHICLE COMPASS COMPENSATION, now U.S. Pat. No. 6,922,902; Ser. No. 11/284,543, filed Nov. 22, 2005, now U.S. Pat. No. 7,370,983; Ser. No. 11/226,628, filed Sep. 14, 2005; and/or Ser. No. 10/933,842, filed Sep. 3, 2004 by Kulas et al. for INTERIOR REARVIEW MIRROR ASSEMBLY, now U.S. Pat. No. 7,249,860; and/or U.S. Pat. Nos. 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and 6,642,851, and/or PCT Application No. PCT/US2004/015424, filed May 18, 2004 by Donnelly Corp. et al. for MIRROR ASSEMBLY FOR VEHICLE, and/or European patent application, published Oct. 11, 2000 under Publication No. EP 0 1043566, which are all hereby incorporated herein by reference in their entireties. The compass circuitry may include the compass sensor, such as a magneto-responsive sensor, such as a magneto-resistive sensor, such as the types disclosed in U.S. Pat. Nos. 5,255,442; 5,632,092; 5,802,727; 6,173,501; 6,427,349; and 6,513,252 (which are hereby incorporated herein by reference in their entireties), a magneto-capacitive sensor, a Hall-effect sensor, such as the types described in U.S. Pat. Nos. 6,278,271; 5,942,895 and 6,184,679 (which are hereby incorporated herein by reference in their entireties), a magneto-inductive sensor, such as described in U.S. Pat. No. 5,878,370 (which is hereby incorporated herein by reference in its entirety), a magneto-impedance sensor, such as the types described in PCT Publication No. WO 2004/076971 A2, published Sep. 10, 2004 (which is hereby incorporated herein by reference in its entirety), or a flux-gate sensor or the like, and/or may comprise a compass chip, such as described in U.S. patent application Ser. No. 11/226,628, filed Sep. 14, 2005; and/or Ser. No. 11/284,543, filed Nov. 22, 2005, now U.S. Pat. No. 7,370,983, which are hereby incorporated herein by reference in their entireties. By positioning the compass sensors at a fixed location, further processing and calibration of the sensors to accommodate adjustment or movement of the sensors is not necessary.

Optionally, the mounting structure and/or mirror casing may support one or more imaging sensors or cameras, and may fixedly support them with the cameras set with a desired or appropriate forward and/or rearward field of view. For example, the camera may be operable in conjunction with a forward facing imaging system, such as a rain sensing system, such as described in U.S. Pat. Nos. 6,968,736; 6,806,452; 6,516,664; 6,353,392; 6,313,454; 6,250,148; 6,341,523; and 6,824,281, and in U.S. patent application Ser. No. 10/958,087, filed Oct. 4, 2004 by Schofield et al. for VEHICLE ACCESSORY MODULE, now U.S. Pat. No. 7,188,963; and/or Ser. No. 11/201,661, filed Aug. 11, 2005 by DeWard et al.

for ACCESSORY MODULE FOR VEHICLE, now U.S. Pat. No. 7,480,149, which are all hereby incorporated herein by reference in their entireties. The mounting structure and/or mirror casing may be pressed or loaded against the interior surface of the windshield to position or locate the image sensor in close proximity to the windshield and/or to optically couple the image sensor at the windshield. The mounting structure and/or mirror casing may include an aperture or apertures at its forward facing or mounting surface and the windshield may include apertures through the opaque frit layer (typically disposed at a mirror mounting location of a windshield) or the windshield may not include such a frit layer, depending on the particular application.

Optionally, the image sensor may be operable in conjunction with a forward or rearward vision system, such as an automatic headlamp control system and/or a lane departure warning system or object detection system and/or other forward vision or imaging systems, such as imaging or vision systems of the types described in U.S. Pat. Nos. 7,038,577; 7,005,974; 7,004,606; 6,690,268; 6,946,978; 6,757,109; 6,717,610; 6,396,397; 6,201,642; 6,353,392; 6,313,454; 5,550,677; 5,670,935; 5,796,094; 5,715,093; 5,877,897; 6,097,023; and 6,498,620, and/or U.S. patent application Ser. No. 09/441,341, filed Nov. 16, 1999 by Schofield et al. for VEHICLE HEADLIGHT CONTROL USING IMAGING SENSOR, now U.S. Pat. No. 7,339,149; Ser. No. 10/422,512, filed Apr. 24, 2003, now U.S. Pat. No. 7,123,168; Ser. No. 11/239,980, filed Sep. 30, 2005; Ser. No. 11/315,675, filed Dec. 22, 2005 by Higgins-Luthman for OBJECT DETECTION SYSTEM FOR VEHICLE; and/or Ser. No. 11/672, 070, filed Feb. 7, 2007, and/or PCT Application No. PCT/US2006/041709, filed Oct. 27, 2006 and published May 10, 2007 as International Publication No. WO 07/053404, and/or U.S. provisional applications, Ser. No. 60/628,709, filed Nov. 17, 2004 by Camilleri et al. for IMAGING AND DISPLAY SYSTEM FOR VEHICLE; Ser. No. 60/614,644, filed Sep. 30, 2004; Ser. No. 60/618,686, filed Oct. 14, 2004 by Laubinger for VEHICLE IMAGING SYSTEM; Ser. No. 60/731, 183, filed Oct. 28, 2005 by Gibson for CAMERA MODULE FOR VEHICLE VISION SYSTEM; and/or Ser. No. 60/765, 797, filed Feb. 7, 2006 by Briggance for CAMERA MOUNTED AT REAR OF VEHICLE, which are hereby incorporated herein by reference in their entireties. The imaging sensor of the imaging systems may utilize aspects of the imaging sensors and systems discussed above, and/or may utilize aspects of the camera modules described in U.S. patent application Ser. No. 10/534,632, filed May 11, 2005; and/or PCT Application No. PCT/US2006/041709, filed Oct. 27, 2006 and published May 10, 2007 as International Publication No. WO 07/053404, which are hereby incorporated herein by reference in their entireties. The mirror casing thus may support one or more rearward facing imaging sensors or cameras, such as for rearward vision or imaging systems, such as for a rear vision system or back up aid of the types described in U.S. Pat. Nos. 6,717,610 and/or 6,201,642 (which are hereby incorporated herein by reference in their entireties), and/or a cabin monitoring system or baby view system of the types described in U.S. Pat. No. 6,690,268 (which is hereby incorporated herein by reference in its entirety), and/or the like. By locating the image sensors or cameras at a fixed mirror casing, the rearward field of view of the driver may be adjusted (via actuator 18) with no affect on the field of view of the camera, such that the mirror assembly of the present invention provides an enhanced mounting arrangement for such imaging sensors or cameras. The performance of such image sensors or cameras may also be enhanced due to the reduced vibration of the mounting structure and/or mirror casing of the mirror assembly of the present invention.

The image processor for processing the images captured by the imaging device or devices or sensors or cameras may be an existing processor that is located at or near the interior rearview mirror for processing images captured from an existing forward facing imaging sensor or camera with a forward field of view. For example, the image processor and forward facing camera may be part of or operable in conjunction with an automatic headlamp control (AHC) system or a rain sensing system or a lane departure warning (LDW) system or a traffic sign recognition (TSR) system (such as the types described in U.S. Pat. No. 7,004,606, which is hereby incorporated herein by reference in its entirety) or the like. Optionally, for example, the image processor may comprise an EyeQ™ image processing chip available from Mobileye Vision Technologies Ltd. of Jerusalem, Israel. Such image processors include object detection software (such as the types described in U.S. patent application Ser. No. 10/427, 051, filed Apr. 30, 2003, now U.S. Pat. No. 7,038,577; and/or Ser. No. 11/315,675, filed Dec. 22, 2005 by Higgins-Luthman for OBJECT DETECTION SYSTEM FOR VEHICLE, which are hereby incorporated herein by reference in their entireties), and analyzes image data to detect objects. Other types of image processors may be utilized while remaining within the spirit and scope of the present invention.

Optionally, the fixed mounting structure and/or mirror casing may house or support a display device, such as a heads up display device (such as the types described in U.S. patent application Ser. Nos. 11/105,757, filed Apr. 14, 2005, now U.S. Pat. No. 7,526,103; and Ser. No. 11/029,695, filed Jan. 5, 2005, now U.S. Pat. No. 7,253,723, which are hereby incorporated herein by reference in their entireties) that is operable to project a display at the area in front of the driver to enhance viewing of the display information without adversely affecting the driver's forward field of view. For example, the mirror casing may support a heads up display (HUD), such as a MicroHUD™ head-up display system available from MicroVision Inc. of Bothell, Wash., and/or such as a HUD that utilizes aspects described in U.S. patent application Ser. Nos. 11/105,757, filed Apr. 14, 2005, now U.S. Pat. No. 7,526,103; and Ser. No. 11/029,695, filed Jan. 5, 2005, now U.S. Pat. No. 7,253,723, which are hereby incorporated herein by reference in their entireties. For example, MicroVision's MicroHUD™ combines a MEMS-based micro display with an optical package of lenses and mirrors to achieve a compact high-performance HUD module that reflects a virtual image off the windscreen that appears to the driver to be close to the front of the car. This laser-scanning display can outperform many miniature flat panel LCD display screens because it can be clearly viewed in the brightest conditions and also dimmed to the very low brightness levels required for safe night-time driving. For example, such a display device may be located at or in the mirror casing and may be non-movably mounted at the mirror casing or mounting structure, and may be operable to project the display information at the windshield of the vehicle so as to be readily viewed by the driver of the vehicle in the driver's forward field of view. By locating the HUD module at or in the fixed mounting structure and/or mirror casing, the display may be displayed at the windshield and generally at or in the driver's forward field of view irrespective of the adjustment or angle of the mirror reflective element.

The mounting structure and/or mirror casing may be fixedly attached to or supported at the vehicle windshield and may extend upward toward the headliner of the vehicle. Thus, the mirror assembly of the present invention may have enhanced wire management and may substantially conceal the wiring of the electronic components/accessories between the circuitry within the mirror casing and the headliner at the upper portion of the vehicle windshield. Optionally, the mirror assembly may include wire management elements, such as the types described in U.S. patent application Ser. Nos. 11/226,628, filed Sep. 14, 2005; and/or Ser. No. 11/584,697, filed Oct. 20, 2006, now U.S. Pat. No. 7,510,287; and/or U.S. provisional application Ser. No. 60/729,430, filed Oct. 21, 2005, which are hereby incorporated herein by reference in their entireties, to conceal the wires extending between an upper portion of the mirror casing and the vehicle headliner (or overhead console). Optionally, the mirror casing may abut the headliner and/or may be an extension of an overhead console of the vehicle (such as by utilizing aspects described in U.S. patent application Ser. No. 10/538,724, filed Jun. 13, 2005 by Hutzel et al. for ACCESSORY SYSTEM FOR VEHICLE, and/or U.S. patent application Ser. No. 10/510,813, filed Aug. 23, 2002 by Berberich et al. for COVER MODULE, now U.S. Patent Application Publication No. US2005/0151396A1, published Jul. 14, 2005, which are hereby incorporated herein by reference in their entireties). The mirror casing of the mirror assembly of the present invention thus may allow for utilization of the area above the mirror reflective element for additional mirror content, such as additional electronic accessories or circuitry, and thus may provide for or accommodate additional mirror content/circuitry and/or vehicle content/circuitry.

Optionally, the mirror assembly and/or reflective element assembly may include one or more displays, such as for the accessories or circuitry described herein. The displays may comprise any suitable display, such as displays of the types described in U.S. Pat. Nos. 5,530,240 and/or 6,329,925, which are hereby incorporated herein by reference in their entireties, or may be display-on-demand or transflective type displays or other displays, such as the types described in U.S. Pat. Nos. 6,690,268; 5,668,663 and/or 5,724,187, and/or U.S. patent application Ser. Nos. 10/054,633, filed Jan. 22, 2002 by Lynam et al. for VEHICULAR LIGHTING SYSTEM, now U.S. Pat. No. 7,195,381; Ser. No. 11/021,065, filed Dec. 23, 2004 by McCabe et al. for ELECTRO-OPTIC MIRROR CELL, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 by Hutzel et al. for ACCESSORY SYSTEM FOR VEHICLE; Ser. No. 11/226,628, filed Sep. 14, 2005 by Karner et al.; Ser. No. 10/993,302, filed Nov. 19, 2004, now U.S. Pat. No. 7,338,177; and/or Ser. No. 11/284,543, filed Nov. 22, 2005, now U.S. Pat. No. 7,370,983, and/or PCT Patent Application No. PCT/US2006/018567, filed May 15, 2006 by Donnelly Corp. et al.; and/or U.S. provisional applications, Ser. No. 60/836,219, filed Aug. 8, 2006 by Weller et al. for INTERIOR REARVIEW MIRROR ASSEMBLY WITH DISPLAY; Ser. No. 60/759,992, filed Jan. 18, 2006; and Ser. No. 60/732,245, filed Nov. 1, 2005, and/or PCT Application No. PCT/US03/40611, filed Dec. 19, 2003 by Donnelly Corp. et al. for ACCESSORY SYSTEM FOR VEHICLE, which are all hereby incorporated herein by reference in their entireties, or may include or incorporate video displays or the like, such as the types described in U.S. Pat. No. 6,690,268 and/or PCT Application No. PCT/US03/40611, filed Dec. 19, 2003 by Donnelly Corp. et al. for ACCESSORY SYSTEM FOR VEHICLE, U.S. patent application Ser. Nos. 10/538,724, filed Jun. 13, 2005; and/or Ser. No. 11/284,543, filed Nov. 22, 2005, now U.S. Pat. No. 7,370,983, which are hereby incorporated herein by reference in their entireties. Optionally, the mirror assembly may include a video display that is selectively positionable, such as extendable/retractable or pivotable or foldable so as to be selectively positioned at a side or below the mirror casing when in use and storable within or at least partially within the mirror casing when not in use. The display may automatically extend/pivot to the in-use position in response to an actuating event, such as when the vehicle is shifted into its reverse gear for a rear vision system or back up aid.

Such a video mirror display (or other display) may be associated with a rearward facing camera at a rear of the vehicle and having a rearward field of view, such as at the license plate holder of the vehicle or at a rear trim portion (such as described in U.S. patent application Ser. No. 11/672,070, filed Feb. 7, 2007, and U.S. provisional application Ser. No. 60/765,797, filed Feb. 7, 2006, which is hereby incorporated herein by reference in its entirety). The image data captured by the rearward facing camera may be communicated to the control or video display at the rearview mirror assembly (or elsewhere in the vehicle, such as at an overhead console or accessory module or the like) via any suitable communication means or protocol. For example, the image data may be communicated via a fiber optic cable or a twisted pair of wires, or may be communicated wirelessly, such as via a BLUETOOTH® communication link or protocol or the like, or may be superimposed on a power line, such as a 12 volt power line of the vehicle, such as by utilizing aspects of the systems described in U.S. patent application Ser. No. 11/239,980, filed Sep. 30, 2005 by Camilleri et al. for VISION SYSTEM FOR VEHICLE, which is hereby incorporated herein by reference in its entirety.

Optionally, images captured by the imaging devices or sensors or cameras may be displayed on a display element or screen (such as a video display screen), such as at a display screen at an exterior mirror reflective element (such as by utilizing aspects of the system described in U.S. provisional application Ser. No. 60/857,025, filed Nov. 6, 2006, which is hereby incorporated herein by reference in its entirety). The display may encompass or span a portion of the reflective element (such as an upper, outboard corner region of the reflective element) and/or may encompass the entirety or substantially the entirety of the reflective element (and may be viewable through the mirror reflective element). The interior or exterior mirror reflective element at which the display may be located may comprise a transflective mirror reflective element such that the display screen images may be viewable through the transflective mirror reflective element when the display screen is activated but substantially not viewable through the transflective mirror reflective element when the display screen is deactivated.

Optionally, the mirror assembly may include one or more user inputs for controlling or activating/deactivating one or more electrical accessories or devices of or associated with the mirror assembly. Because the bezel portion 12d of mirror casing 12 is fixedly supported at the vehicle, the bezel portion is highly suitable for supporting or receiving one or more user inputs or buttons 26 (FIG. 3) thereat. For example, the bezel portion 12d may include one or more user inputs or buttons at the side region of the mirror or at a lower or chin region or at an upper or brow region, whereby actuation or pressing by a user against the buttons will not cause mis-adjustment of the reflective element, since the reflective element is not attached to and movable with the fixed or non-movable bezel portion.

For example, the mirror assembly may comprise any type of switches or buttons, such as touch or proximity sensing switches, such as touch or proximity switches of the types described in PCT Application No. PCT/US03/40611, filed Dec. 19, 2003 by Donnelly Corporation for ACCESSORY SYSTEM FOR VEHICLE; and/or PCT Application No. PCT/US2004/015424, filed May 18, 2004 by Donnelly Corp. et al. for MIRROR ASSEMBLY FOR VEHICLE, and/or U.S. Pat. Nos. 6,001,486; 6,310,611; 6,320,282; and 6,627,918; and/or U.S. patent application Ser. No. 11/021,065, filed Dec. 23, 2004, now U.S. Pat. No. 7,255,451; and/or U.S. patent application Ser. Nos. 09/817,874, filed Mar. 26, 2001 by Quist et al. for INTERACTIVE AUTOMOTIVE REARVISION SYSTEM, now U.S. Pat. No. 7,224,324; Ser. No. 10/956,749, filed Oct. 1, 2004 by Schofield et al. for MIRROR REFLECTIVE ELEMENT ASSEMBLY INCLUDING ELECTRONIC COMPONENT, now U.S. Pat. No. 7,446,924; Ser. No. 10/933,842, filed Sep. 3, 2004 by Kulas et al. for INTERIOR REARVIEW MIRROR ASSEMBLY, now U.S. Pat. No. 7,249,860; Ser. No. 11/021,065, filed Dec. 23, 2004, now U.S. Pat. No. 7,255,451; and/or Ser. No. 11/140, 396, filed May 27, 2005, now U.S. Pat. No. 7,360,932, which are hereby incorporated herein by reference in their entireties, or the inputs may comprise other types of buttons or switches, such as those described in U.S. Pat. No. 6,501,387, and/or U.S. patent application Ser. Nos. 11/029,695, filed Jan. 5, 2005, now U.S. Pat. No. 7,253,723; and/or Ser. No. 11/451, 639, filed Jun. 13, 2006 by Uken for MIRROR ASSEMBLY FOR VEHICLE, now U.S. Pat. No. 7,527,403, which are hereby incorporated herein by reference in their entireties, or such as fabric-made position detectors, such as those described in U.S. Pat. Nos. 6,504,531; 6,501,465; 6,492,980; 6,452,479; 6,437,258; and 6,369,804, which are hereby incorporated herein by reference in their entireties. Other types of switches or buttons or inputs or sensors may be incorporated to provide the desired function, without affecting the scope of the present invention. The manual inputs or user actuatable inputs or actuators may control or adjust or activate/deactivate one or more accessories or elements or features. For touch sensitive inputs or applications or switches, the mirror assembly or accessory module or input may, when activated, provide a positive feedback (such as activation of an illumination source or the like, or such as via an audible signal, such as a chime or the like, or a tactile or haptic signal, or a rumble device or signal or the like) to the user so that the user is made aware that the input was successfully activated.

Optionally, the user inputs or buttons may comprise user inputs for a garage door opening system, such as a vehicle based garage door opening system of the types described in U.S. Pat. Nos. 7,023,322; 6,396,408; 6,362,771; and 5,798, 688, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,946,978; 6,477,464; 6,678,614; and/or 7,004, 593, and/or U.S. patent application Ser. Nos. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; Ser. No. 10/529,715, filed Mar. 30, 2005 by Larson et al. for MICROPHONE SYSTEM FOR VEHICLE; Ser. No. 10/538,724, filed Jun. 13, 2005 by Hutzel et al. for ACCESSORY SYSTEM FOR VEHICLE; and/or Ser. No. 10/964,512, filed Oct. 13, 2004, now U.S. Pat. No. 7,308,341, which are all hereby incorporated herein by reference in their entireties.

Optionally, the display and inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 6,877,888; 6,690,268; 6,824,281; 6,672, 744; 6,386,742; and 6,124,886, and/or PCT Application No. PCT/US03/40611, filed Dec. 19, 2003 by Donnelly Corporation for ACCESSORY SYSTEM FOR VEHICLE, and/or PCT Application No. PCT/US04/15424, filed May 18, 2004 by Donnelly Corporation et al. for MIRROR ASSEMBLY FOR VEHICLE, and/or U.S. patent application Ser. No. 10/510,813, filed Aug. 23, 2002 by Berberich et al. for COVER MODULE, now U.S. Patent Application Publication No. US2005/0151396A1, published Jul. 14, 2005, which are hereby incorporated herein by reference in their entireties.

Optionally, the mirror assembly may fixedly or non-movably support one or more other accessories or features, such as one or more electrical or electronic devices or accessories. For example, illumination sources or lights, such as map reading lights or one or more other lights or illumination sources, such as illumination sources of the types disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 6,971,775; and/or 5,669, 698, and/or U.S. patent application Ser. Nos. 10/054,633, filed Jan. 22, 2002, now U.S. Pat. No. 7,195,381; and/or Ser. No. 10/933,842, filed Sep. 3, 2004 by Kulas et al. for INTERIOR REARVIEW MIRROR ASSEMBLY, now U.S. Pat. No. 7,249,860, which are hereby incorporated herein by reference in their entireties, may be included in the mirror assembly. The illumination sources and/or the circuit board may be connected to one or more buttons or inputs for activating and deactivating the illumination sources. Because the mirror casing is fixedly positioned at the vehicle, the illumination sources may be targeted or focused toward a target area, such as a lap region of a person for a map reading light or the like, whereby the illumination sources or lights illuminate the targeted area irrespective of the adjustment of the mirror reflective element.

Optionally, the mirror assembly may also or otherwise include other accessories, such as microphones, such as analog microphones or digital microphones or the like, such as microphones of the types disclosed in U.S. Pat. Nos. 6,243, 003; 6,278,377; and/or 6,420,975, and/or in PCT Application No. PCT/US03/308877, filed Oct. 1, 2003 by Donnelly Corp. et al. for MICROPHONE SYSTEM FOR VEHICLE. Optionally, the mirror assembly may also or otherwise include other accessories, such as a telematics system, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection and/or indication system, such as disclosed in U.S. Pat. Nos. 7,126, 456; 7,038,577; 6,882,287; 5,929,786 and/or 5,786,772, and/ or U.S. patent application Ser. No. 11/315,675, filed Dec. 22, 2005 by Higgins-Luthman for OBJECT DETECTION SYSTEM FOR VEHICLE; and/or PCT Application No. PCT/ US2006/026148, filed Jul. 5, 2006 for VEHICLE EXTERIOR MIRROR ASSEMBLY WITH BLIND SPOT INDICATOR, and published Jan. 11, 2007 as PCT International Publication No. WO 2007/005942 A1; and/or U.S. provisional applications, Ser. No. 60/857,025, filed Nov. 6, 2006; Ser. No. 60/918,089, filed Mar. 15, 2007; and/or Ser. No. 60/853,850, filed Oct. 24, 2006, transmitters and/or receivers, such as for a garage door opener or a vehicle door unlocking system or the like (such as a remote keyless entry system), a digital network, such as described in U.S. Pat. No. 5,798,575, a hands-free phone attachment, a multi-media feature, such as described in U.S. provisional applications, Ser. No. 60/896,134, filed Mar. 21, 2007; Ser. No. 60/902,280, filed Feb. 20, 2007; Ser. No. 60/901,514, filed Feb. 13, 2007; Ser. No. 60/900,282, filed Feb. 8, 2007; Ser. No. 60/879,619, filed Jan. 10, 2007; Ser. No. 60/850,700, filed Oct. 10, 2006; and Ser. No. 60/847,502, filed Sep. 27, 2006 by Kramer for MULTIMEDIA MIRROR ASSEMBLY FOR VEHICLE, imaging system or components or circuitry or display thereof, such as an imaging and/or display system of the types described in U.S. Pat. Nos. 6,690,268 and 6,847,487; and/or U.S. provisional applications, Ser. No. 60/614,644, filed Sep. 30, 2004; Ser. No. 60/618,686, filed Oct. 14, 2004; and/or Ser. No. 60/628,709, filed Nov. 17, 2004; and/or U.S. patent application Ser. Nos. 11/105,757, filed Apr. 14, 2005, now U.S. Pat. No. 7,526,103; Ser. No. 11/334,139, filed Jan. 18, 2006, now U.S. Pat. No. 7,400,435; and/or Ser. No. 11/239,980, filed Sep. 30, 2005, a video device for internal cabin surveillance (such as for sleep detection or driver drowsiness detection or the like) and/or video telephone function, such as disclosed in U.S. Pat. Nos. 5,760,962 and/or 5,877,897, an occupant detection system and/or interior cabin monitoring system (such as the types described in U.S. Pat. Nos. 6,019,411 and/or 6,690,268, and/or PCT Application No. PCT/US2005/042504, filed Nov. 22, 2005 and published Jun. 1, 2006 as International Publication No. WO 2006/058098 A2; and/or PCT Application No. PCT/US94/01954, filed Feb. 25, 1994, a heating element, particularly for an exterior mirror application, such as the types described in U.S. patent application Ser. No. 11/334,139, filed Jan. 18, 2006, now U.S. Pat. No. 7,400,435, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; and/or 6,731,205; and/or U.S. patent application Ser. No. 11/232,324, filed Sep. 21, 2005 by O'Brien et al. for TIRE PRESSURE ALERT SYSTEM, now U.S. Pat. No. 7,423,522, and/or an ONSTAR® system and/or any other accessory or circuitry or the like (with all of the above-referenced patents and PCT and U.S. patent applications being commonly assigned to Donnelly Corporation, and with the disclosures of the referenced patents and patent applications being hereby incorporated herein by reference in their entireties).

Because the mounting structure and/or mirror casing is fixedly attached at the windshield or other structure of the vehicle, the mirror assembly of the present invention may contain circuitry for various systems or applications or accessories, and may contain other components of such systems or applications or accessories that may have added too much weight to a conventional adjustable interior rearview mirror assembly. The additional weight of such components and/or circuitry is supported by the windshield or other vehicular structure and thus does not result in reduced vibration performance of the mirror assembly.

The reflective element assembly of the mirror assembly may comprise a prismatic mirror reflector or an electrically variable reflectance mirror reflector, such as an electro-optic reflective element assembly or cell, such as an electrochromic reflective element assembly or cell. For example, the rearview mirror assembly may comprise an electro-optic or electrochromic reflective element or cell, such as an electrochromic mirror assembly and electrochromic reflective element utilizing principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407; 4,824,221; 5,818,636; 6,166,847; 6,111,685; 6,392,783; 6,710,906; 6,798,556; 6,554,843; 6,420,036; 5,142,406; 5,442,478; and/or 4,712,879, and/or 4,712,879, and/or U.S. patent application Ser. Nos. 10/054,633, filed Jan. 22, 2002 by Lynam et al. for VEHICULAR LIGHTING SYSTEM, now U.S. Pat. No. 7,195,381; Ser. No. 11/021,065, filed Dec. 23, 2004 by McCabe et al. for ELECTRO-OPTIC MIRROR CELL, now U.S. Pat. No. 7,255,451; Ser. No. 10/528,269, filed Mar. 17, 2005, now U.S. Pat. No. 7,274,501; Ser. No. 10/533,762, filed May 4, 2005, now U.S. Pat. No. 7,184,190; Ser. No. 10/538,724, filed Jun. 13, 2005 by Hutzel et al. for ACCESSORY SYSTEM FOR VEHICLE; Ser. No. 11/226,628, filed Sep. 14, 2005 by Karner et al.; Ser. No. 10/993,302, filed Nov. 19, 2004, now U.S. Pat. No. 7,338,177; and/or Ser. No. 11/284,543, filed Nov. 22, 2005, now U.S. Pat. No. 7,370,983, and/or International Pat. Publication Nos. WO 2004/098953, published Nov. 18, 2004; WO 2004/042457, published May 21, 2004; WO 2003/084780, published Oct. 16, 2003; and/or WO 2004/026633, published Apr. 1, 2004, which are all hereby incorporated herein by reference in their entireties, and/or such as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated herein by reference in their entireties.

Optionally, use of an elemental semiconductor mirror, such as a silicon metal mirror, such as disclosed in U.S. Pat. Nos. 6,286,965; 6,196,688; 5,535,056; 5,751,489; and 6,065,840, and/or in U.S. patent application Ser. No. 10/993,302, filed Nov. 19, 2004 by Lynam for MIRROR REFLECTIVE ELEMENT FOR A VEHICLE, now U.S. Pat. No. 7,338,177, which are all hereby incorporated herein by reference in their entireties, can be advantageous because such elemental semiconductor mirrors (such as can be formed by depositing a thin film of silicon) can be greater than 50 percent reflecting in the photopic (SAE J964a measured), while being also substantially transmitting of light (up to 20 percent or even more). Such silicon mirrors also have the advantage of being able to be deposited onto a flat glass substrate and to be bent into a curved (such as a convex or aspheric) curvature, which is also advantageous since many passenger-side exterior rearview mirrors are bent or curved.

Optionally, the electrochromic circuitry and/or a glare sensor (such as a rearward facing glare sensor that receives light from rearward of the mirror assembly and vehicle through a port or opening along the casing and/or bezel portion and/or reflective element of the mirror assembly) and circuitry and/or an ambient light sensor and circuitry may be provided on one or more circuit boards of the mirror assembly.

Optionally, the mirror assembly may comprise a prismatic mirror assembly, such as a prismatic mirror assembly utilizing aspects described in U.S. Pat. Nos. 6,318,870; 6,598,980; 5,327,288; 4,948,242; 4,826,289; 4,436,371; and 4,435,042; and PCT Application No. PCT/US04/015424, filed May 18, 2004 by Donnelly Corporation et al. for MIRROR ASSEMBLY FOR VEHICLE; and U.S. patent application Ser. No. 10/933,842, filed Sep. 3, 2004, now U.S. Pat. No. 7,249,860, which are hereby incorporated herein by reference in their entireties. Optionally, the prismatic reflective element may comprise a conventional prismatic reflective element or prism, or may comprise a prismatic reflective element of the types described in PCT Application No. PCT/US03/29776, filed Sep. 19, 2003 by Donnelly Corp. et al. for MIRROR REFLECTIVE ELEMENT ASSEMBLY; U.S. patent application Ser. Nos. 10/709,434, filed May 5, 2004 by Lynam for MIRROR REFLECTIVE ELEMENT, now U.S. Pat. No. 7,420,756; Ser. No. 10/933,842, filed Sep. 3, 2004 by Kulas et al. for INTERIOR REARVIEW MIRROR ASSEMBLY, now U.S. Pat. No. 7,249,860; Ser. No. 11/021,065, filed Dec. 23, 2004 by McCabe et al. for ELECTRO-OPTIC MIRROR CELL, now U.S. Pat. No. 7,255,451; Ser. No. 10/528,269, filed Mar. 17, 2005, now U.S. Pat. No. 7,274,501; and/or Ser. No. 10/993,302, filed Nov. 19, 2004 by Lynam for MIRROR REFLECTIVE ELEMENT FOR A VEHICLE, now U.S. Pat. No. 7,338,177, and/or PCT Application No. PCT/US2004/015424, filed May 18, 2004 by Donnelly Corp. et al. for MIRROR ASSEMBLY FOR VEHICLE, which are all hereby incorporated herein by reference in their entireties, without affecting the scope of the present invention.

Such prismatic mirror reflective elements may be formed from various materials such as plastic or glass, and typically have a planar front surface extending at an angle to a planar rear surface. The rear surface is coated with a reflective layer of metal (such as chromium, aluminum or alloys thereof or other suitable materials) as is conventionally known in the industry. The reflective element is pivotable relative to a mounting assembly of the mirror to pivot the reflective surface in order to reduce glare during nighttime conditions. When the reflective element is pivoted from a full reflectivity day position to a reduced reflectivity night position, the reflective surface is rotated such that uncoated front surface is aligned for viewing by the vehicle driver instead of reflective surface. Preferably, the reflective surface reflects at least about 60 percent to about 95 percent of the light incident thereon, while the uncoated front surface reflects a reduced amount of light, such as about 4 percent of the light incident thereon, thereby significantly reducing glare from headlights or other bright lights to the rear of the vehicle to the driver's eyes.

For applications with such prismatic reflective elements or other reflective elements of similar construction and/or functionality, it is envisioned that the mirror assembly of the present invention may include a user actuatable input or button or switch or toggle or the like for selectively switching or "flipping" the mirror between the day setting and the night or anti-glare setting. For example, a button or toggle or other input (such as touch sensor or proximity sensor or the like, such as described above) may be located at the mirror casing (and may be located at a lower region of the bezel portion so as to be generally at the location of a typical toggle or flip mechanism of a conventional prismatic mirror assembly) and a user (such as the driver of the vehicle) may selectively actuate the input to change the mirror setting. When the input is actuated, the mirror actuator automatically rotates or pivots the prismatic reflective element about a generally horizontal pivot axis to pivot or flip the reflective element between the day position and the night or anti-glare position. The input may comprise a button that causes the actuator to move the reflective element to the other position (for example, if the mirror reflective element is at the day setting when the input is actuated, the mirror actuator will pivot the reflective element to the night setting, or conversely, if the mirror reflective element is at the night setting when the input is actuated, the mirror actuator will pivot the reflective element to the day setting), or the input may comprise a toggle or two-way switch or two inputs, whereby the user selects or moves the input in a desired direction to change the day/night mirror setting. Optionally, the mirror assembly may include a manual toggle or switch that a user can actuate to pivot or flip the mirror reflective element between the day position and the night or anti-glare position.

Optionally, the mirror actuator may automatically pivot the mirror reflective element to change the day/night mirror setting when the conditions are appropriate for such change. For example, the mirror actuator may automatically change the mirror reflective element day/night setting in response to one or more photo sensors or glare sensors of the mirror assembly (such as glare sensors of the types used in connection with electrochromic mirror assemblies to cause automatic dimming of the electrochromic reflective element or cell). Thus, a prismatic reflective element may provide auto-dimming or auto-glare-reduction feature via the mirror actuator and associated controls and sensors.

Optionally, the reflective element may comprise a bent, wide-angle mirror reflector rather than a flat mirror reflector. If a bent, wide-angle mirror reflector is used, it is preferable that the mirror reflector comprise a glass substrate coated with a bendable reflector coating (such as of silicon as described in U.S. Pat. Nos. 6,065,840; 5,959,792; 5,535,056 and 5,751,489, which are hereby incorporated by reference herein in their entireties.

Therefore, the present invention provides a self-contained unit or mirror assembly that provides an adjustable reflective element that is adjustable via actuation of an electronic mirror actuator. The self-contained mirror unit may include one or more electronic accessories or devices at or in the mirror casing, where the accessories/devices may be fixedly or non-movably supported irrespective of any adjustment of the reflective element. The mirror unit thus provides enhanced support of such accessories/devices, particularly of compass sensors and image sensors and the like, and provides enhanced vibration performance of the mirror.

Changes and modifications to the specifically described embodiments may be carried out without departing from the principles of the present invention, which is intended to be limited only by the scope of the appended claims as interpreted according to the principles of patent law.

The invention claimed is:

1. A rearview mirror system for a vehicle, said rearview mirror system comprising:

an interior rearview mirror assembly comprising a mounting structure, an electrical actuator, and a reflective element;

said mounting structure being configured to be detachably mounted at an attachment element adhered to an inner surface of the vehicle windshield;

wherein said mounting structure is adjustable relative to the vehicle windshield to generally vertically adjust a nominal setting of a rearward field of view of said reflective element;

wherein said mounting structure comprises a pivot joint and wherein said reflective element is pivotable about said pivot joint to at least generally vertically adjust said nominal setting of said rearward field of view of said reflective element relative to the vehicle windshield;

wherein said pivot joint comprises at least two detents that correspond to at least two nominal settings;

wherein said electrical actuator is operable to adjust said reflective element in order to vertically and horizontally adjust a rearward field of view of said reflective element when said reflective element is at one of said at least two nominal settings;

wherein said electrical actuator is operable to adjust said reflective element at least approximately 5 degrees from each of said at least two nominal settings in a generally vertical direction and a generally horizontal direction;

said interior rearview mirror assembly comprising an imaging sensor, said imaging sensor having a forward field of view through the vehicle windshield; and wherein said forward field of view of said imaging sensor is not adjusted when said electrical actuator adjusts said rearward field of view of said reflective element.

2. A rearview mirror system for a vehicle, said rearview mirror system comprising:

an interior rearview mirror assembly comprising a mounting structure, an electrical actuator, and a reflective element;

said mounting structure being configured to be detachably mounted at an attachment element adhered to an inner surface of the vehicle windshield;

wherein said mounting structure is adjustable relative to the vehicle windshield to generally vertically adjust a nominal setting of a rearward field of view of said reflective element to at least two nominal settings;

wherein said electrical actuator is operable to adjust said reflective element in order to vertically and horizontally adjust a rearward field of view of said reflective element when said reflective element is at one of said at least two nominal settings;

wherein said electrical actuator is operable to adjust said reflective element at least approximately 5 degrees from each of said at least two nominal settings in at least two directions;

a control for controlling said electrical actuator in response to an input, said input comprising at least one of a user actuated input and a vehicle input;

said interior rearview mirror assembly comprising an imaging sensor, said imaging sensor having a forward field of view through the vehicle windshield; and wherein said forward field of view of said imaging sensor is not adjusted when said electrical actuator adjusts said rearward field of view of said reflective element.

* * * * *